United States Patent
Morikawa et al.

(10) Patent No.: US 7,999,998 B2
(45) Date of Patent: Aug. 16, 2011

(54) SHORT WAVELENGTH LIGHT SOURCE AND LASER IMAGE FORMING APPARATUS

(75) Inventors: Akihiro Morikawa, Osaka (JP); Kiminori Mizuuchi, Osaka (JP); Hiroyuki Furuya, Nara (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 269 days.

(21) Appl. No.: 12/438,111

(22) PCT Filed: Oct. 24, 2007

(86) PCT No.: PCT/JP2007/070730
§ 371 (c)(1),
(2), (4) Date: Feb. 19, 2009

(87) PCT Pub. No.: WO2008/050802
PCT Pub. Date: May 2, 2008

(65) Prior Publication Data
US 2010/0165453 A1 Jul. 1, 2010

(30) Foreign Application Priority Data

Oct. 27, 2006 (JP) ................................. 2006-292477
Oct. 27, 2006 (JP) ................................. 2006-292478

(51) Int. Cl.
*G02F 1/37* (2006.01)
(52) U.S. Cl. ......................................... 359/328; 372/22
(58) Field of Classification Search .......... 359/326–332; 372/21–22
See application file for complete search history.

(56) References Cited

U.S. PATENT DOCUMENTS

| | | | | | |
|---|---|---|---|---|---|
| 5,353,292 A | * | 10/1994 | Motegi | ............................. | 372/21 |
| 5,898,718 A | * | 4/1999 | Mohatt et al. | ................... | 372/22 |
| 6,130,900 A | * | 10/2000 | Black et al. | ...................... | 372/25 |
| 2003/0133680 A1 | | 7/2003 | Yokoyama et al. | | |

FOREIGN PATENT DOCUMENTS

| | | |
|---|---|---|
| JP | 5-204011 | 8/1993 |
| JP | 5-249518 | 9/1993 |
| JP | 11-125800 | 5/1999 |
| JP | 2000-321610 | 11/2000 |
| JP | 2001-272705 | 10/2001 |
| JP | 2003-140211 | 5/2003 |
| JP | 2003-270467 | 9/2003 |
| JP | 2004-53781 | 2/2004 |
| JP | 2004-69901 | 3/2004 |

OTHER PUBLICATIONS

International Search Report issued Nov. 27, 2007 in International (PCT) Application No. PCT/JP2007/070730.

* cited by examiner

*Primary Examiner* — Daniel Petkovsek
(74) *Attorney, Agent, or Firm* — Wenderoth Lind & Ponack, L.L.P.

(57) ABSTRACT

A short wavelength light source includes a wavelength conversion element having an incident surface, on which a fundamental wave is incident, and an output surface, from which a harmonic wave is outputted. The wavelength conversion element converts the fundamental wave into the harmonic wave. In addition, the wavelength conversion element includes a holder holding the wavelength conversion element, wherein the wavelength conversion element has a specific region on a light output side, which is arranged so as to suppress variations in phase matching condition between the fundamental wave and the harmonic wave resulting from heat generated by absorbing the harmonic wave during a wavelength conversion.

21 Claims, 23 Drawing Sheets

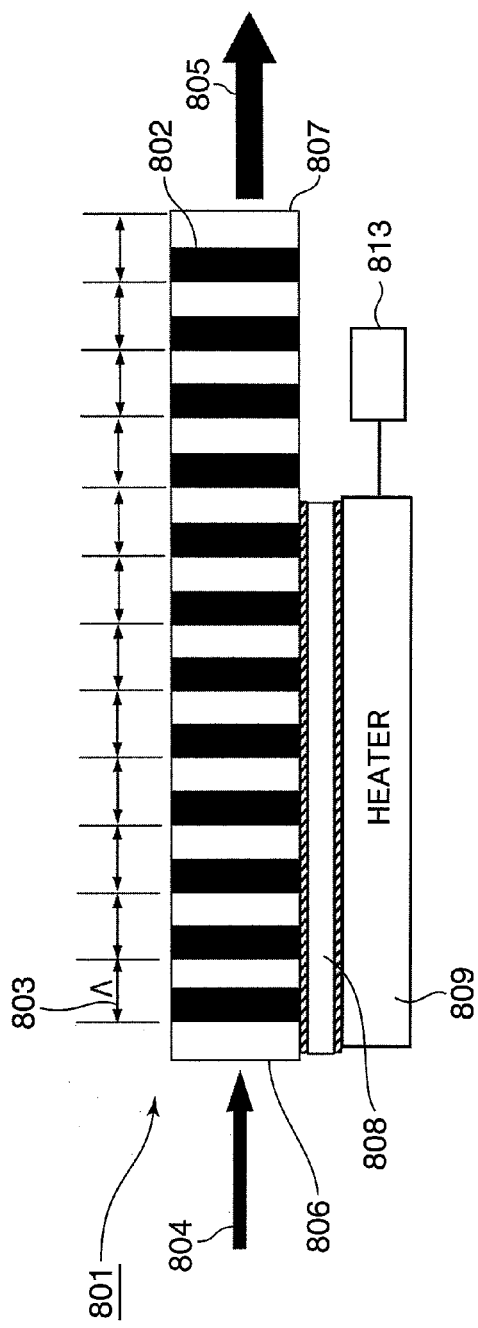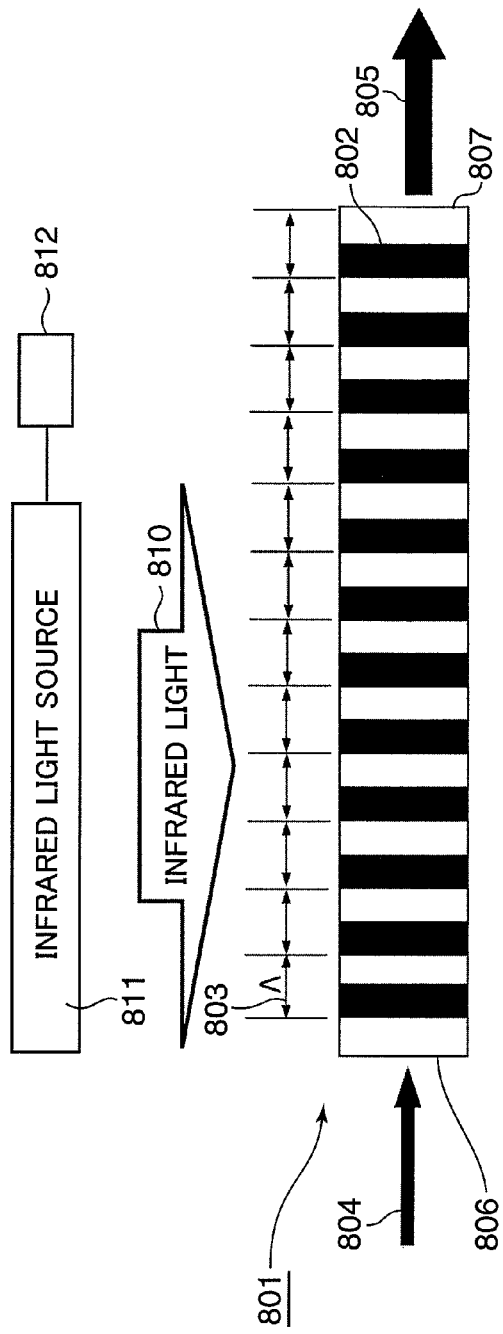

SHORT WAVELENGTH LIGHT SOURCE AND LASER IMAGE FORMING APPARATUS

FIELD OF TECHNOLOGY

The present invention relates to a short wavelength light source and a laser image forming apparatus using the same.

DESCRIPTION OF THE BACKGROUND ART

By utilizing the phenomenon of forcibly reversing the polarization of a ferroelectric, a periodically poled region (periodically poled structure) can be formed in the ferroelectric. The periodically poled region thus formed has been used, for example, in an optical frequency modulator using a surface acoustic wave, an optical wavelength conversion element using nonlinear polarization reversal, an optical polarizer using a reversal structure of a prism shape or a lens shape, and the like. Particularly, an optical wavelength conversion element with high conversion efficiency can be realized by periodically reversing the nonlinear polarization of a nonlinear optical substance. By carrying out the wavelength conversion of a semiconductor laser or the like using the foregoing optical wavelength conversion element, it is possible to realize a small-size short wavelength light source applicable in the fields of printing, optical information processing and optical application measurement control. Furthermore, by carrying out the wavelength conversion of the light emitted from a high-output laser (fiber laser or solid-state laser) in the order of watt using the foregoing optical wavelength conversion element, it is possible to obtain a short wavelength visible light (green, blue) in the order of watt or a high-output ultraviolet laser, thereby realizing a high-output short wavelength light source applicable to high-luminance display, processing, exposure, etc.

As a prospective method for realizing the generation of high-output CW visible light in the order of watt by a single pass conversion of a fundamental wave, a technique of generating a second harmonic using a periodically poled $LiNbO_3$ (hereinafter, abbreviated as "PPLN") is known. Such $LiNbO_3$ (hereinafter, abbreviated as "LN") has a large nonlinear optical constant, CW short wavelength light in the order of watt can be generated by a single pass. However, the use of LN has caused problems of making an output unstable and necessitating a high temperature operation due to influences such as optical damage and green induced infrared absorption (hereinafter, abbreviated as "GRIIRA").

As a solution to the foregoing problem, it is known to generate visible short wavelength light by a single pass structure using periodically poled $MgO:LiNbO_3$ (hereinafter, abbreviated as "PPMgLN"). Since $MgO:LiNbO_3$ (hereinafter, abbreviated as "MgLN") has a higher nonlinear optical constant and better optical damage resistance and transmission characteristic in a short wavelength range than LN, it is promising as a highly nonlinear material capable of realizing a CW output in the order of watt at room temperature by the single pass structure.

Various methods have been proposed to suppress a reduction in conversion efficiency by an element temperature distribution in a wavelength conversion element caused by the laser light incident on the wavelength conversion element, examples of which includes the method of providing linearly heating means is provided as disclosed in patent document 1, the method of adjusting the position of the wavelength conversion element according to a temperature distribution in an optical axis direction so that a temperature difference in a crystal falls within 0.1° C. as disclosed in patent document 2, the method of reducing the temperature distribution in a propagation direction in the wavelength conversion element by adopting means for cooling an incident surface and an output surface of the element separately from the means for adjusting the temperature of a central part of the element as disclosed in patent document 3. Patent document 4 discloses the structure wherein four Peltier devices are provided on the side surfaces facing one another to maintain the wavelength conversion efficiency to suppress the temperature distribution in the widthwise direction of the wavelength conversion element.

However, with MgLN expected as a material capable of realizing a CW output in the order of watt at room temperature, another phenomenon different from the generation of the element temperature distribution caused by optical damage, GRIIRA or laser incidence occurred at the time of a high output, whereby a new problem of making a harmonic output unstable or damaging the crystal occurred. As a result of our verification of causes of this, it was found out that heat was generated in the crystal due to ultraviolet induced harmonic absorption caused by the interaction of a fundamental wave and a harmonic wave and a harmonic output became unstable. Particularly, in a light source in which a sum frequency wave of a fundamental wave and a harmonic wave is generated during the high-output harmonic generation, it was found that heat generation by harmonic absorption was notable. Conventionally, such heat generation by the harmonic absorption and sum frequency wave has not been recognized.

Further, a wavelength conversion element wherein a period for the periodical polarization inversion structure is changed to increase the tolerance range for phase matching conditions of the wavelength conversion element has been proposed as disclosed in patent document 5.

Patent Document 1:
  Japanese Unexamined Patent Publication No. H11-125800
Patent Document 2:
  Japanese Unexamined Patent Publication No. 2003-140211
Patent Document 3:
  Japanese Unexamined Patent Publication No. 2004-53781
Patent Document 4:
  Japanese Unexamined Patent Publication No. H05-204011
Patent Document 5:
  Japanese Unexamined Patent Publication No. 2000-321610

DISCLOSURE OF THE INVENTION

An object of the present invention is to provide a short wavelength light source capable of stabilizing a harmonic output by suppressing a temperature distribution in an element caused by heat generated by harmonic absorption to maintain conversion efficiency.

A short wavelength light source according to one aspect of the present invention includes a wavelength conversion element having an incident surface, on which a fundamental wave is incident, and an output surface, from which a harmonic wave is outputted, the wavelength conversion element being provided for converting the fundamental wave into the harmonic wave; and a holder for holding said wavelength conversion element, wherein the wavelength conversion element has a specific region on the light output side, which is arranged so as to suppress variations in phase matching condition between the fundamental wave and the harmonic wave resulting from heat generated by absorbing the harmonic wave during a wavelength conversion.

According to the foregoing structure of the short wavelength light source, variations in phase matching condition between the fundamental wave and the harmonic wave resulting from heat generation is suppressed even if heat is generated by the absorption of the harmonic wave in the specific region of the wavelength conversion element. It is therefore possible to stabilize a harmonic output.

According to the present invention, it is possible to realize a short wavelength light source capable of stabilizing a harmonic output by suppressing a temperature distribution in the wavelength conversion element caused by heat generated by harmonic absorption to maintain the wavelength conversion efficiency.

BRIEF DESCRIPTION OF THE DRAWINGS

FIGS. 8A and 8B are cross-sectional views showing a schematic structure of a short wavelength light source according to a sixth embodiment of the present invention;

BEST MODES FOR EMBODYING THE INVENTION

Figure 1A:
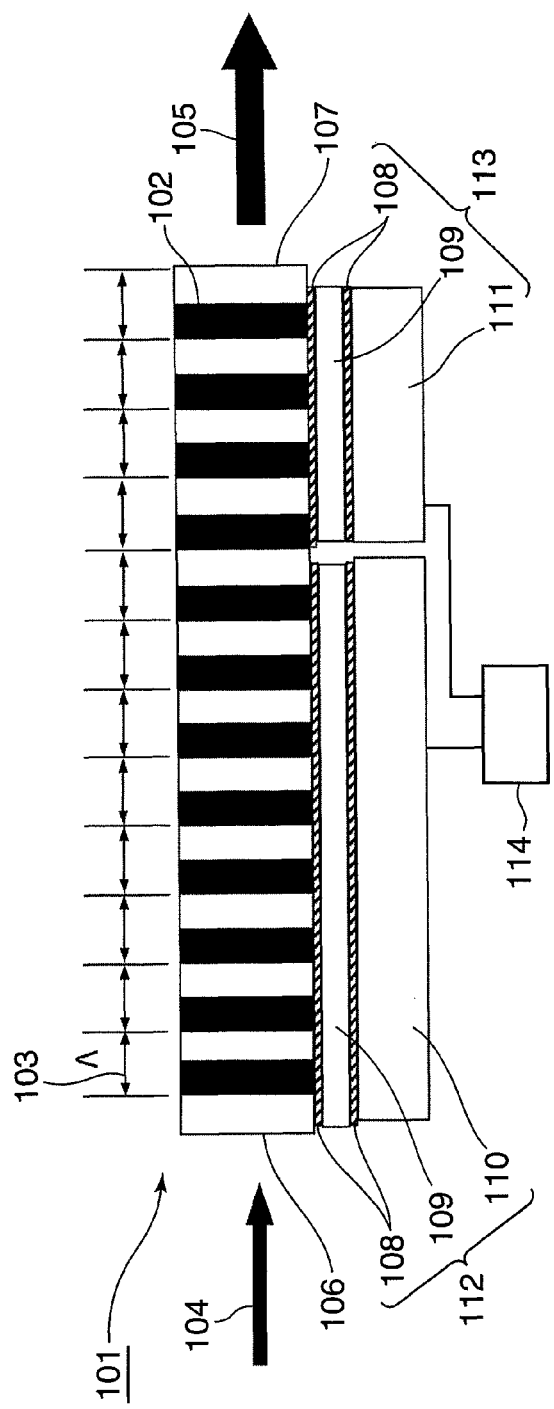
FIG. 1A is a cross-sectional view showing a schematic structure of a short wavelength light source according to a first embodiment of the present invention and FIG. 1B is a graph showing a relationship between a distance from an incident surface of a wavelength conversion element and a SHG output.

Hereinafter, embodiments of the present invention are described with reference to the drawings. It should be noted that same elements are designated by same reference numerals and may not be repeatedly described in some cases. The drawings mainly and schematically show structural elements for easier understanding and do not precisely show the shapes and the like thereof.

First Embodiment

Figure 10:
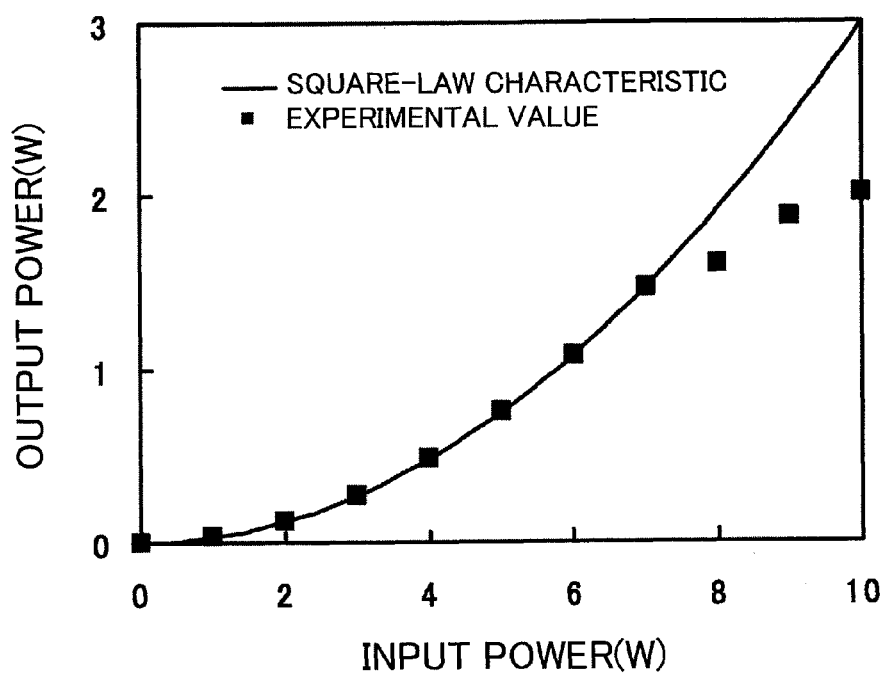
FIG. 10 is a graph showing a SHG output characteristic of a conventional short wavelength light source.
Figure 12:
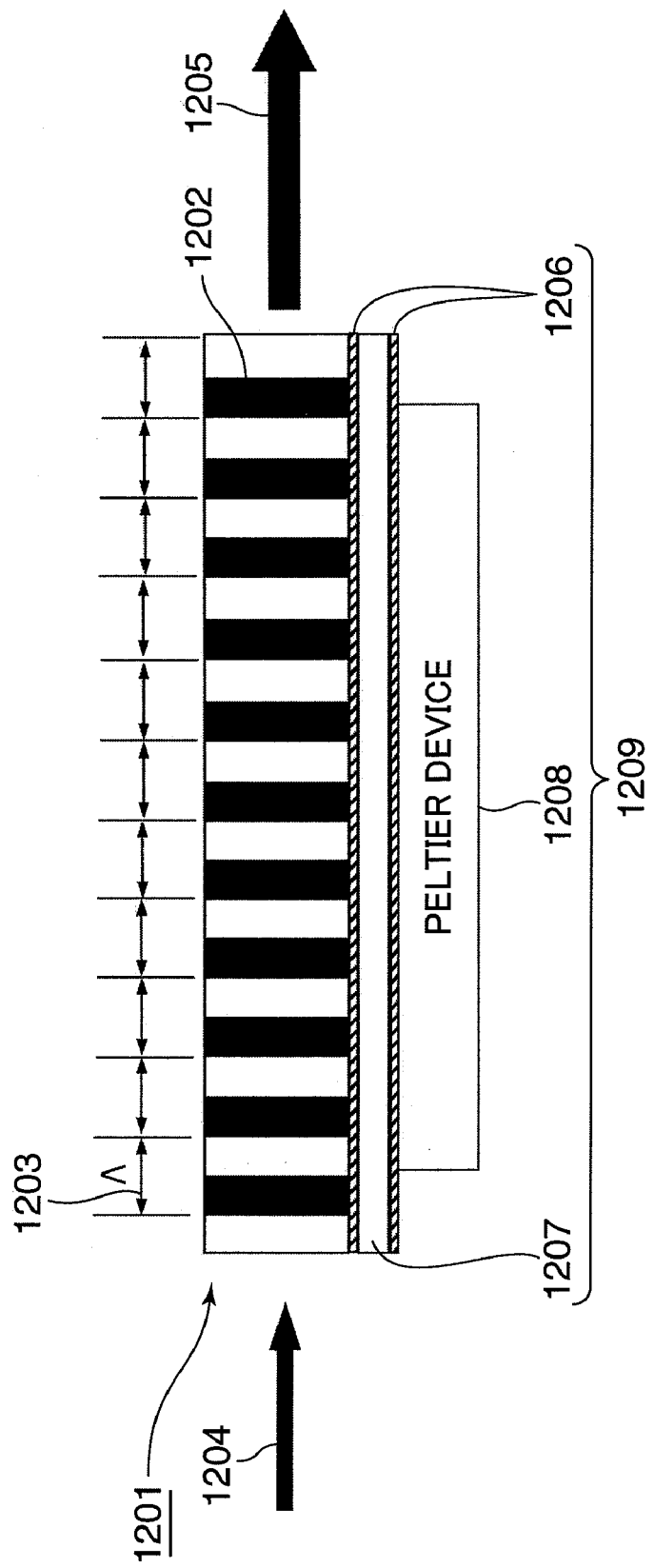
FIG. 12 is a cross-sectional view showing a schematic structure of a conventional short wavelength light source.

First of all, output instability of a wavelength conversion element as a background of the present invention is described. FIG. 12 shows a schematic structure of a conventional short wavelength light source. A wavelength conversion element 120 of FIG. 12 is a bulk-type wavelength conversion element having a periodically poled structure. In the case of converting a fundamental wave 1204 into a second harmonic (hereinafter, referred to as a "SHG") 1205, an output of the SHG 1205 increases in proportion to the square of the fundamental wave 1204. However, upon exceeding a specified SHG output, a phenomenon in which the output of the SHG 1205 is largely reduced from a square-law characteristic was observed. FIG. 10 shows a change of the output of the SHG 1205 in relation to the input power of the fundamental wave 1204. As shown in FIG. 10, the square-law characteristic does not hold approximately after the output power of the SHG 1205 exceeds 1.5 watts.

Figure 11:
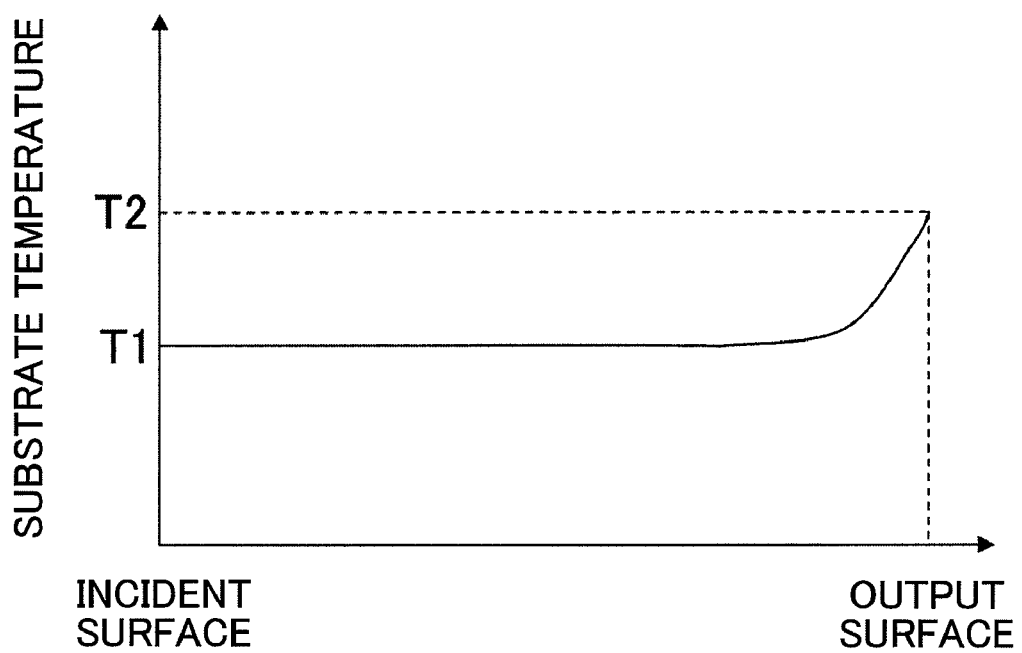
FIG. 11 is a graph showing an element temperature distribution when SHG conversion efficiency is deteriorated.

Upon examining the cause of this reduction, it was found out that a THG (whose wavelength is ⅓ of that of the fundamental wave 1204) as a sum frequency wave of the fundamental wave 1204 and the SHG 1205 was generated when the wavelength conversion element 1201 converted the fundamental wave 1204 into the SHG 1205, the absorption of SHG light by the wavelength conversion element 1201 occurred due to the generation of this THG and a phase matching condition of the wavelength conversion element 1201 was disturbed by heat generation caused by this absorption. FIG. 11 shows a temperature distribution in a light propagation direction of the wavelength conversion element 1201 at this time. The temperature distribution of FIG. 11 could not be avoided although it was tried to maintain the temperature of the wavelength conversion element 1201 using a Peltier device 1208 of FIG. 12. Thus, it was revealed that heat generation by the absorption of the SHG 1205 became notable and the phase matching condition did not hold in an area where the intensity of the THG exceeded a predetermined value, thereby reducing the conversion efficiency of the wavelength conversion element 1201.

Figure 9:
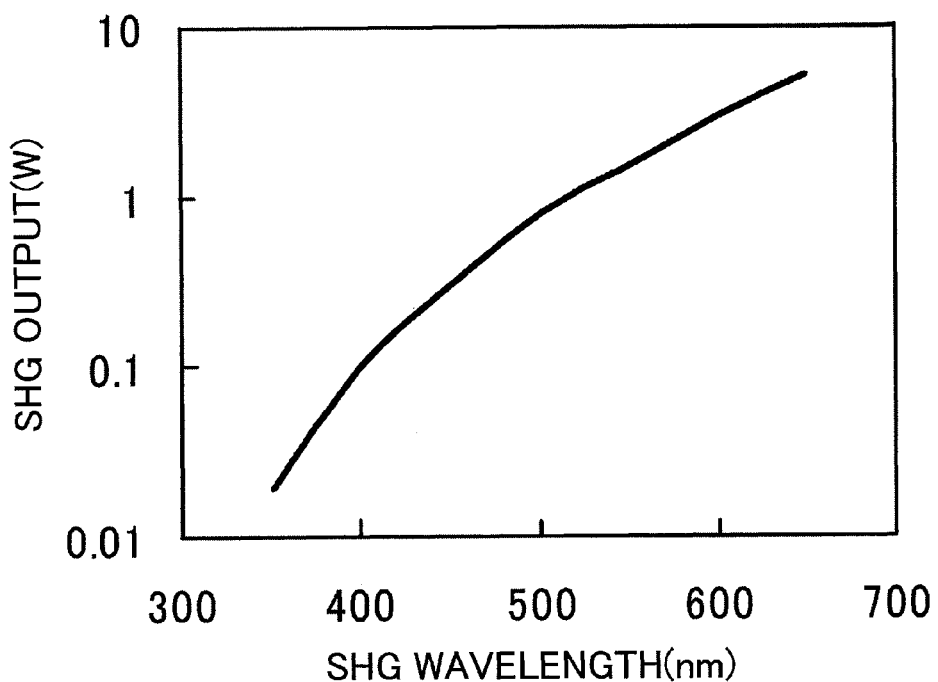
FIG. 9 is a graph showing a relationship between a SHG wavelength and a SHG output at which conversion efficiency is deteriorated.

FIG. 9 shows a relationship between the wavelength of the SHG 1205 and the SHG output at which a conversion efficiency reduction starts. As shown in FIG. 9, it was revealed that the SHG output at which the conversion efficiency reduction started has very strong wavelength dependency on the SHG 1205.

The present embodiment is elaborated based on such a phenomenon and heat generated by the absorption of the SHG is controlled by devising a heat radiation structure, improving a temperature control or heating a part, which does not generate heat, to reduce a temperature distribution of the wavelength conversion element, whereby the conversion efficiency of the wavelength conversion element can be maintained.

FIG. 1A is a cross-sectional view showing a schematic structure of a short wavelength light source according to a first embodiment of the present invention. In the short wavelength light source according to the present embodiment, a plurality of Peltier devices 110, 111 are arranged in a propagation direction of a wavelength conversion element 101. The short wavelength light source according to the present embodiment is, as shown in FIG. 1A, provided with the wavelength conversion element 101, a first holder 112, a second holder 113 and a controller 114. The first holder 112 includes a copper plate 109 sandwiched between two heat radiation materials 108 and the Peltier device 110 for temperature controlling a part of the wavelength conversion element 101 provided on the copper plate 109 by controlling the temperature of the copper plate 109, and the second holder 113 includes a copper plate 109 sandwiched between two heat radiation materials 108 and the Peltier device 111 for temperature controlling a remaining part of the wavelength conversion element 101 provided on the copper plate 109 by controlling the temperature of the copper plate 109. The Peltier device 110 of the first holder 112 and the Peltier device 111 of the second holder 113 are respectively connected to the controller 114 to be temperature-controlled by the controller 114.

In the short wavelength light source of the present embodiment, a plurality of periodically poled regions 102 are formed in the wavelength conversion element 101. The thickness of a substrate forming the wavelength conversion element 101 is 1 mm. The periodically poled regions 102 are formed along a Y-axis of a substrate crystal. The periodically poled regions 102 are formed from a +Z surface of the substrate toward a −Z surface. The periodically poled regions 102 are formed by an electric field applying method. A period 103 for the periodically poled regions 102 is 6.97 μm(Λ), and light (Nd:YAG laser) having a wavelength of 1064 nm can be wavelength converted into green light having a wavelength of 532 nm. The Peltier devices 110, 111 were used as temperature controlling elements for controlling the temperature of the wavelength conversion element 101. In the present embodiment, the Peltier device 110 of the first holder 112 and the Peltier device 111 of the second holder 113 are respectively arranged in the light propagation direction as shown in FIG. 1A and controllable at independent temperatures by the controller 114.

With reference to FIG. 12, a high output characteristic of SHG light in the conventional construction is first described. In the short wavelength light source shown in FIG. 12, the wavelength conversion element 1201 is held by a holder 1209 and the temperature of the wavelength conversion element 1201 is controlled by one Peltier device 1208 of the holder 1209. A copper plate 1207 is bonded to a surface of the wavelength conversion element 1201 via a heat radiation material 1206 to radiate heat generated in the wavelength conversion element 1201. The wavelength conversion element 1201 and the copper plate 1207 are temperature controlled to a specified temperature by the Peltier device 1208. When the length of the wavelength conversion element 1201 was set to 10 mm and a low-power fundamental wave (equal to or below 7 W) 1204 having a wavelength of 1064 nm focused by a condenser lens was incident, a wavelength conversion at conversion efficiency of 3%/W was performed to obtain a SHG 1205 having a wavelength of 532 nm. A highly efficient wavelength conversion can be performed by forming uniform poled regions 1202. If an infrared input power having a wavelength 1064 nm as the fundamental wave 1204 is increased, a harmonic output increases in accordance with the square-law characteristic with a fundamental wave input of 7 W or lower. However, in the conventional short wavelength light source shown in FIG. 12, the harmonic output deviated from the square-law characteristic upon reaching 1.5 W or higher as described with reference to FIG. 10 and became unstable.

In an experiment conducted by the present inventors, such a square-low characteristic deterioration as shown in FIG. 10 was turned out to suddenly notably appear in an area where SHG intensity exceeds a predetermined value. The cause of this may be that phase matching cannot be achieved to reduce the conversion efficiency since a refractive index increases by THG induced SHG absorption and the effective poling periods of the poled structure increase. A refractive index change is about $10^{-6}$ to $10^{-5}$ and occurs by heat generation caused by SHG absorption. Since a change of an absorption coefficient by a change of SHG intensity is not very large, the power of the SHG at which the conversion efficiency is deteriorated has a substantially constant value. Further, it was found that the power of the SHG at which the conversion efficiency was deteriorated had strong wavelength dependency and largely differed depending on the wavelength as shown in FIG. 9. This is thought to result from the dependency of the SHG absorption coefficient on the wavelength of the SHG. Thus, if the wavelength is determined, the power of the SHG at which the conversion efficiency of the SHG is deteriorated can be unambiguously determined.

Accordingly, based on these conditions, the short wavelength light source can be designed. For example, it is assumed that λshg indicates the wavelength of the SHG and P (deterioration) indicates the power of the SHG at which an output is deteriorated in relation to this λshg. If it is desired to output the SHG at a predetermined value Pshg in the short wavelength light source, a heat radiation structure and a temperature control method need to be so optimally designed as to reduce a temperature distribution by the heat generation of the wavelength conversion element.

For example, in the case of converting a fundamental wave having a wavelength of 1064 nm into a SHG having a wavelength of 532 nm in a wavelength conversion element, when a fundamental wave input is 10 W, a focus diameter of the fundamental wave is φ33 μm and a beam quality of the fundamental wave has a substantially ideal Gaussian distribution, the intensity of the SHG exceeds 1.5 W upon advancing about 7 mm from an incident surface of the element toward an output surface when the length of the wavelength conversion element is 10 mm. The value of P (deterioration) at the SHG wavelength of 532 nm is about 1.5 W from FIG. 9. Accordingly, the conversion efficiency of the wavelength conversion element can be drastically increased by performing a temperature control for the wavelength conversion element using a Peltier device arranged at a position of 3 mm from the output surface.

Figure 3:
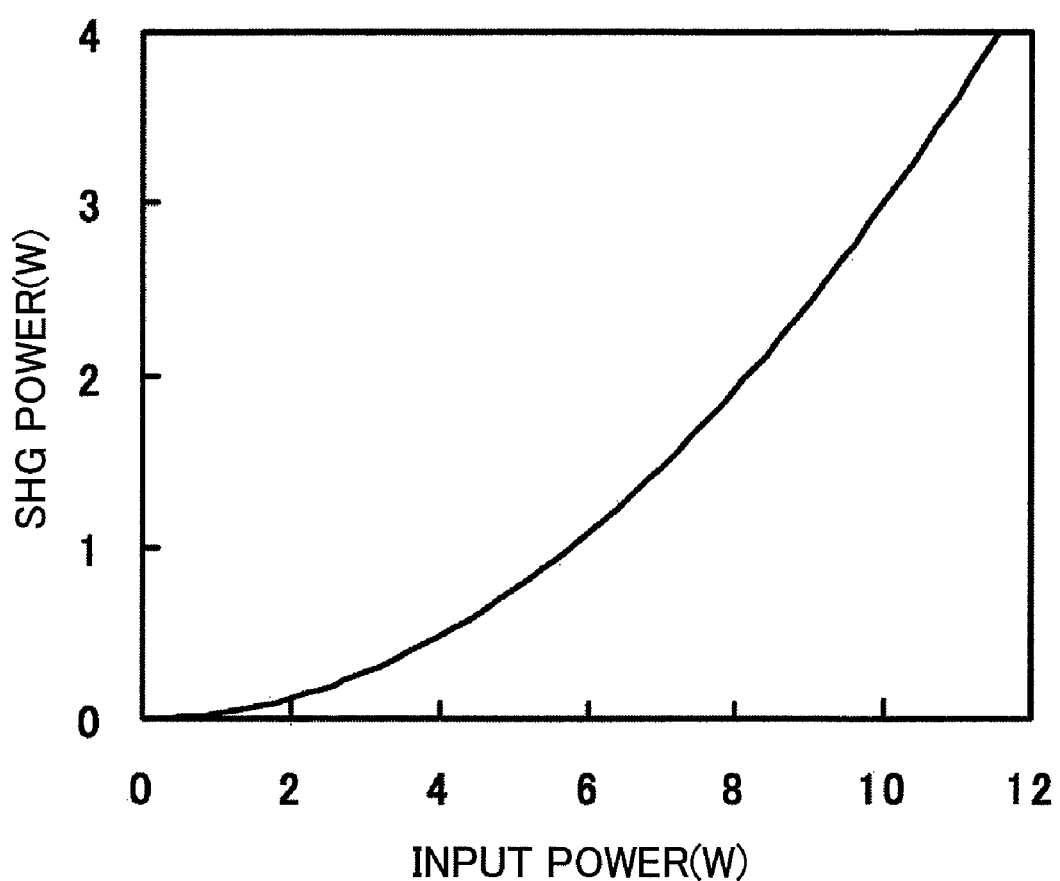
FIG. 3 is a graph showing a relationship between a fundamental wave input power and an SHG output power.

Based on the above proposal, a similar experiment was conducted using the short wavelength light source of the present embodiment shown in FIG. 1A. The periodically poled regions 102 as formed had a polarization reversal characteristic (uniformity, formation area) equivalent to the short wavelength light source shown in FIG. 12, and the same conversion efficiency of 3%/W was obtained when the harmonic output was 1.5 W or lower. When the short wavelength light source shown in FIG. 1A was used, a deterioration of the square-law characteristic, output instability and a conversion efficiency reduction did not occur even when the harmonic output increased to or above 1.5 W, wherefore a stable output and a beam profile with high quality could be obtained. FIG. 3 shows the result. The temperature distribution of the element occurred due to the absorption of the fundamental wave and the harmonic wave at the time of a high green output of 1.5 W, but the element temperature could be fixed by avoiding the temperature distribution in the light propagation direction through the individual control of the two Peltier devices 110, 111. A sudden conversion efficiency reduction occurred in the conventional light source also at the time of a green output of 2.5 W, but a stable output could be obtained by properly controlling the temperature of the two Peltier devices 110, 111 to suppress a conversion efficiency reduction and an output reduction.

Figure 1B:
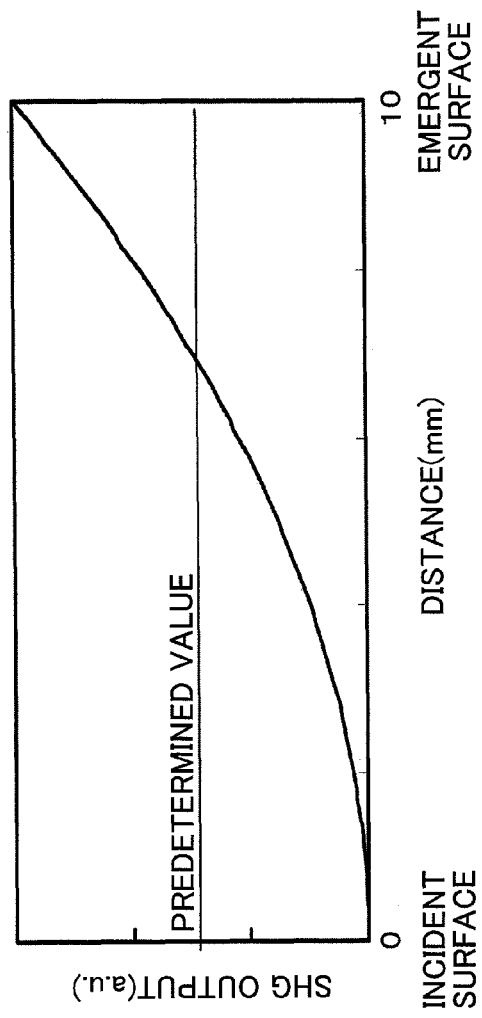

FIG. 1B shows a relationship between a distance from an incident surface 106 of the wavelength conversion element 101 of FIG. 1A and a SHG output. As shown in FIG. 1B, in the short wavelength light source according to the present embodiment, the SHG output (predetermined value) at which the output is deteriorated is exceed when light propagates about 7 mm from the incident surface 106 toward an output surface. As described above, a stable output could be obtained by properly controlling the temperature of the two Peltier devices 110, 111 to suppress a conversion efficiency reduction and an output reduction.

Figure 2:
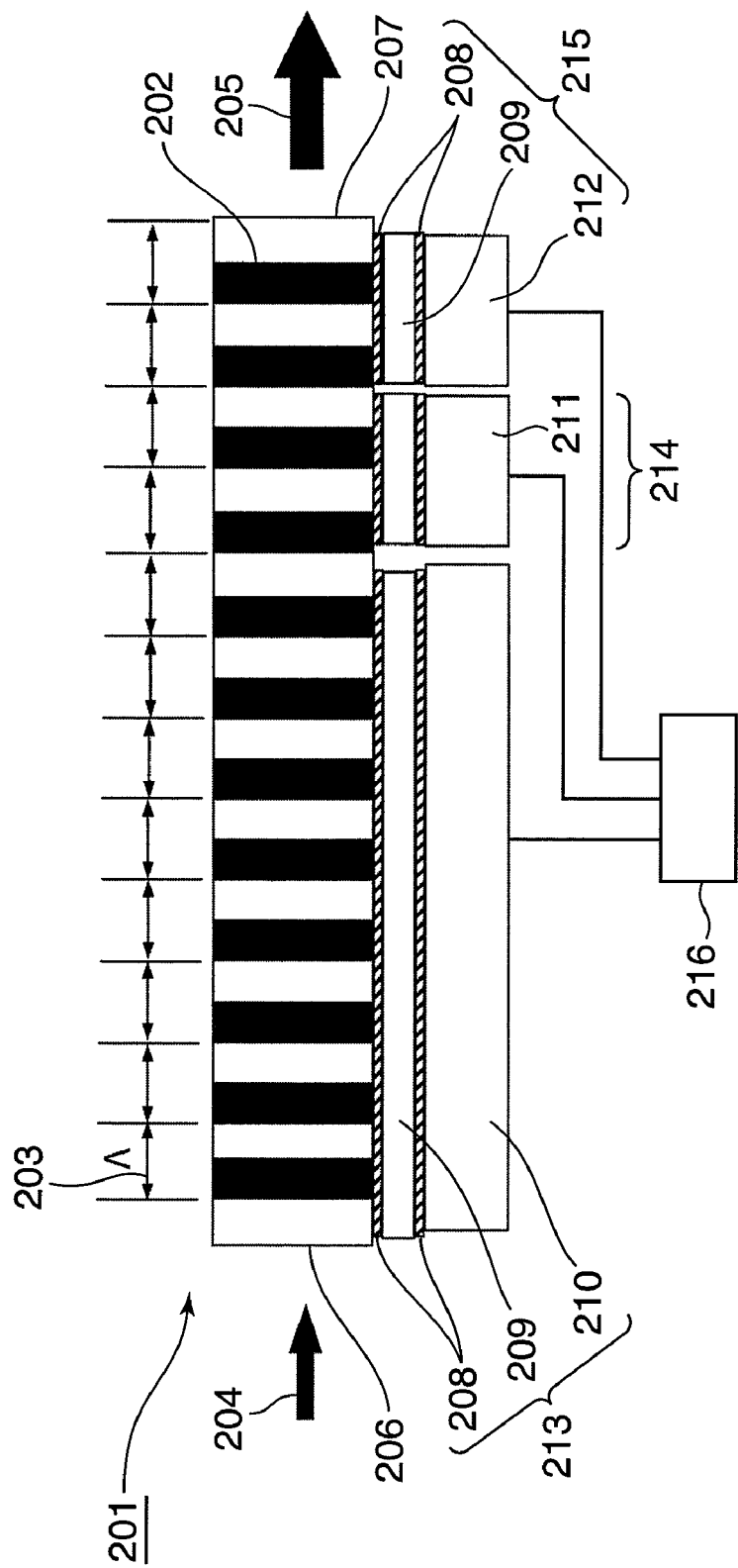
FIG. 2 is a cross-sectional view showing another schematic structure of the short wavelength light source according to the first embodiment of the present invention.

In the short wavelength light source according to the present embodiment, one Peltier device 111 was arranged in vicinity of the output surface where a temperature increase notably appears in order to avoid the temperature distribution in the propagation direction, but two or more Peltier devices may be arranged in vicinity of the output surface. FIG. 2 is a cross-sectional view showing another schematic structure of the short wavelength light source according to the first embodiment of the present invention. In the short wavelength light source of FIG. 2, a plurality of Peltier devices 210, 211 and 212 are arranged in a propagation direction of a wavelength conversion element 201. The short wavelength light source of FIG. 2 is provided with the wavelength conversion element 201, a first holder 213, a second holder 214, a third holder 215 and a controller 216. The first holder 213 includes a copper plate 209 sandwiched between two heat radiation materials 208 and the Peltier device 210 for temperature controlling a part of the wavelength conversion element 201 provided on the copper plate 209 by controlling the temperature of the copper plate 209. The second holder 214 includes a copper plate 209 sandwiched between two heat radiation materials 208 and the Peltier device 211 for temperature controlling another part of the wavelength conversion element 201 provided on the copper plate 209 by controlling the temperature of the copper plate 209. The third holder 215 includes a copper plate 209 sandwiched between two heat radiation materials 208 and the Peltier device 212 for temperature controlling a remaining part of the wavelength conversion element 201 provided on the copper plate 209 by controlling the temperature of the copper plate 209. The Peltier device 210 of the first holder 213, the Peltier device 211 of the second holder 214 and the Peltier device 212 of the third holder 215 are respectively connected to the controller 216 to be temperature-controlled by the controller 216.

In the short wavelength light source of FIG. 2, a plurality of Peltier devices 211, 212 are arranged in vicinity of the output surface of the wavelength conversion element 201 where heat generation concentrates to keep the element temperature constant in accordance with a temperature distribution in a propagation direction. An arrangement method of the Peltier devices 211, 212 is not limited to this arrangement method provided that the temperature distribution is suppressed.

In the short wavelength light source according to the present embodiment, an individually controlled length in vicinity of the output side by the Peltier device(s) is preferably ½ or less of the overall length. In the case of a bulk-type wavelength conversion element, a fundamental wave focusing characteristic for maximizing conversion efficiency is obtained when a focal point is located in the center of the crystal and a beam diameter of the fundamental wave is maximized at the opposite ends of the crystal. At this time, the intensity of the SHG in the element on the output surface is about three times as high as the power in the central part of the element. Crystal destruction by light absorption was found to occur if a maximum output was three times or more as large as the SHG power P (deterioration) at which the conversion efficiency was deteriorated. Thus, an output light increase cannot be obtained even if the individually controlled length in vicinity of the output surface is set equal to or longer than half the element length. Therefore, it is preferable to set this length equal to or shorter than the element length.

Second Embodiment

Next, the second embodiment of the present invention is described. In the present embodiment is described a short wavelength light source constructed to improve a heat radiation characteristic at a part in vicinity of an output surface of a wavelength conversion element where a SHG output and a SHG power density are maximized.

Figure 4:
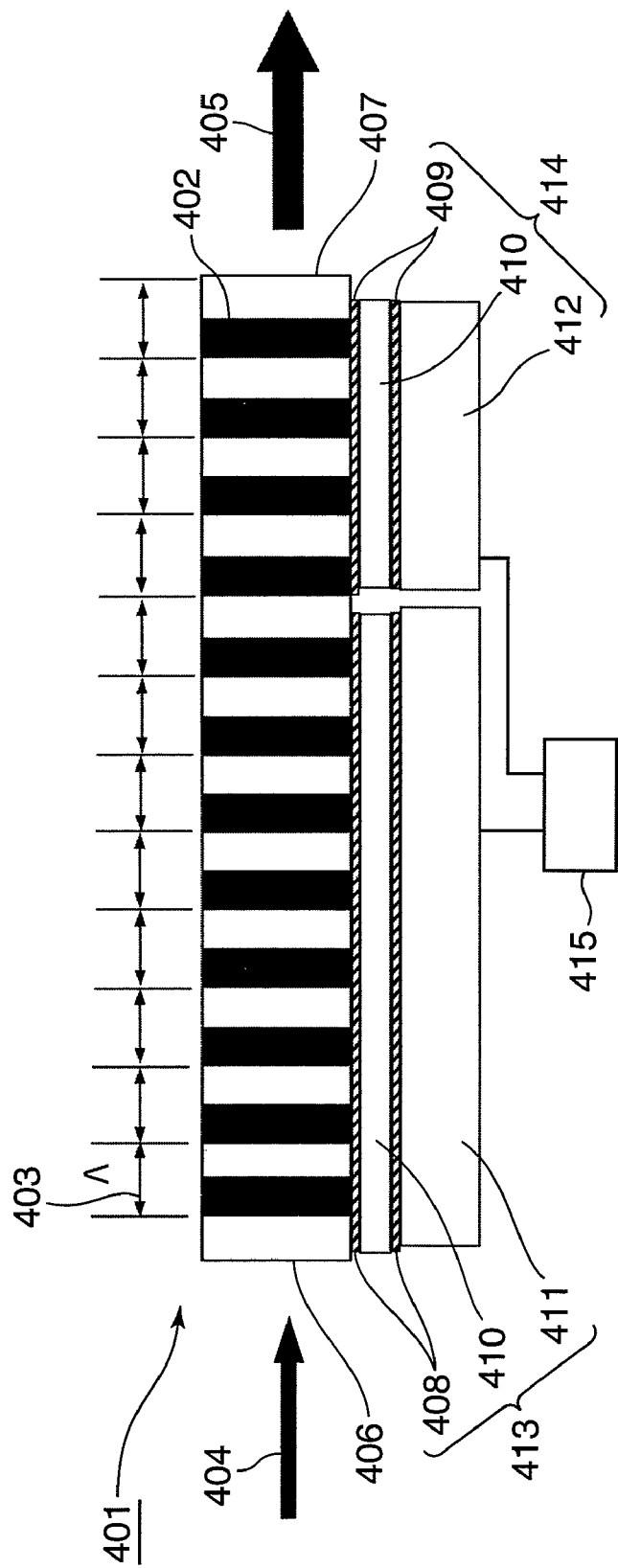
FIG. 4 is a cross-sectional view showing a schematic structure of a short wavelength light source according to a second embodiment of the present invention.

FIG. 4 is a cross-sectional view showing a schematic structure of the short wavelength according to the second embodiment of the present invention. In the short wavelength light source according to the present embodiment, a plurality of Peltier devices 411, 412 are arranged in a propagation direction of a wavelength conversion element 401. The short wavelength light source according to the present embodiment is provided with a first holder 413, a second holder 414 and a controller 415 as shown in FIG. 4. The first holder 413 includes a copper plate 410 sandwiched between two heat radiation materials 408 and the Peltier device 411 for temperature controlling a part of the wavelength conversion element 401 provided on the copper plate 410 by controlling the temperature of the copper plate 410, and the second holder 414 includes a copper plate 410 sandwiched between two heat radiation materials 409 and the Peltier device 412 for temperature controlling a remaining part of the wavelength conversion element 401 provided on the copper plate 410 by controlling the temperature of the copper plate 410. The Peltier device 411 of the first holder 413 and the Peltier device 412 of the second holder 414 are respectively connected to the controller 415 to be temperature-controlled by the controller 415.

The wavelength conversion element 401 of the present embodiment used was such that a plurality of periodically poled regions 402 are formed in a Mg-doped LiNbO$_3$ Z-substrate. A device characteristic and a device structure of the wavelength conversion element 401 are not described since being the same as those of the above first embodiment. Using light (Nd:YAG laser) having a wavelength of 1064 nm as a fundamental wave 404, this light can be wavelength converted into green light (SHG) having a wavelength of 532 nm. The heat radiation materials 408 with low thermal conductivity were used in a part from an incident surface 406 to an element intermediate portion and the heat radiation materials 409 with high thermal conductivity were used in a part from the element intermediate portion to an output surface 407.

Using the short wavelength light source according to the present embodiment shown in FIG. 4, an experiment was conducted on a high output characteristic of a SHG 405. When adopting the short wavelength light source shown in FIG. 4, a deterioration of the square-law characteristic, output instability and a conversion efficiency reduction did not occur even when a harmonic output increased to or above 1.5 W, thereby obtaining a stable output and quality beam profile. Here, a temperature distribution of the wavelength conversion element occurs by absorbing the fundamental wave 404 and the harmonic wave (SHG) 405 in the case of outputting a high power green light of 2 W, which in turn causes an increase in temperature in vicinity of the output surface. However, according to the structure of the present embodiment wherein the heat radiation materials 409 with high thermal conductivity were adopted in vicinity of the output surface, the temperature distribution in the propagation direction can be suppressed, thereby maintaining the temperature of the wavelength conversion element constant in the propagation direction. With the conventional structure of the light source, the conversion efficiency suddenly drops in the case of outputting a high power green light of 2.5 W. In contrast, according to the light source of the present embodiment wherein the heat radiation materials 409 with high thermal conductivity is provided for radiating heat, a reduction in conversion efficiency and a reduction in output power could be suppressed successfully.

Third Embodiment

Next, the third embodiment of the present invention is described. In the foregoing second embodiment, different heat radiation materials are adopted for fixing the wavelength conversion element so as to maintain the temperature distribution in the propagation direction generated from the vicinity of the incident surface to that of the output surface. The method of radiating heat is not limited to this. In the present embodiment, the portion in vicinity of the output surface side of the wavelength conversion element is made thinner so that heat can be radiated desirably, to suppress an increase in temperature in vicinity of the output surface of the wavelength conversion element.

Figure 5:
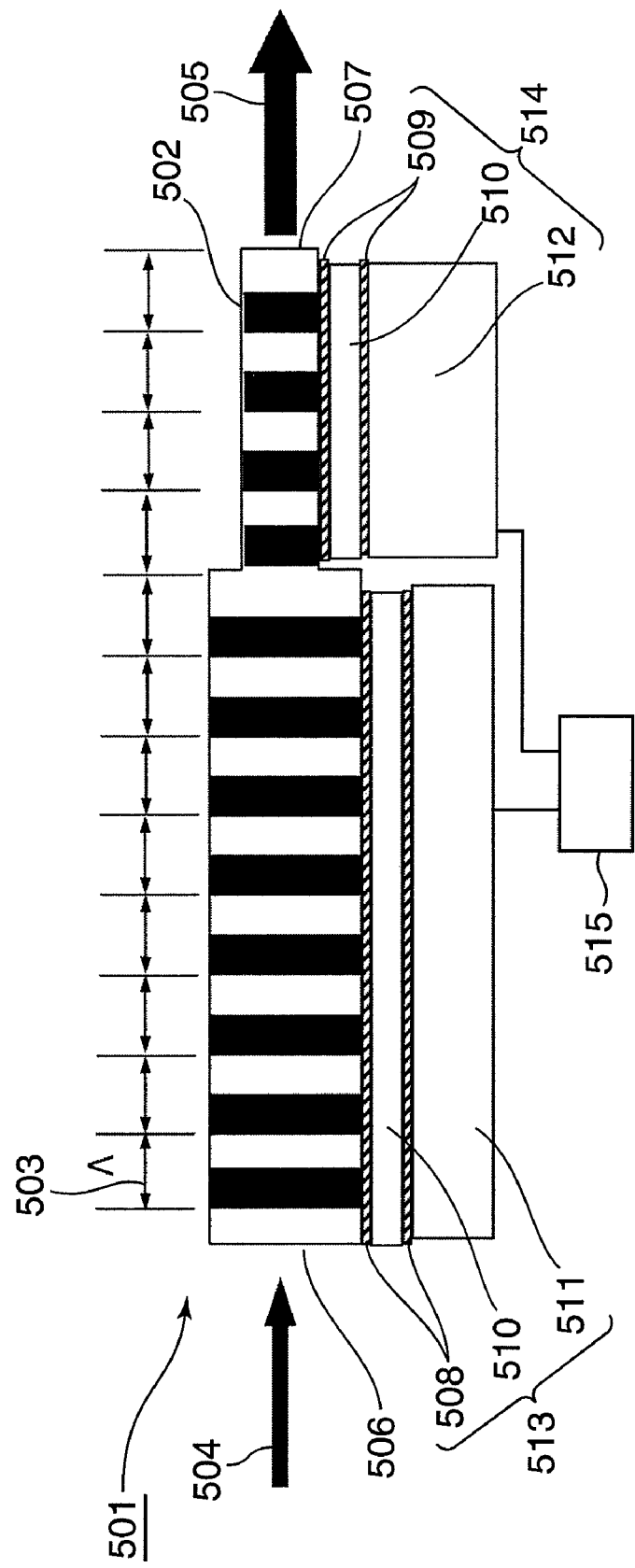
FIG. 5 is a cross-sectional view showing a schematic structure of a short wavelength light source according to a third embodiment of the present invention.

FIG. 5 is a cross-sectional view showing a schematic structure of a short wavelength light source according to the third embodiment of the present invention. In the short wavelength light source according to the present embodiment, a plurality of Peltier devices 511, 512 are arranged in a propagation direction of a wavelength conversion element 501. The short wavelength light source according to the present embodiment is provided with the wavelength conversion element 501, a first holder 513, a second holder 514 and a controller 515 as shown in FIG. 5. The first holder 513 includes a copper plate 510 sandwiched between two heat radiation materials 508 and the Peltier device 511 for temperature controlling a part of the wavelength conversion element 501 provided on the copper plate 510 by controlling the temperature of the copper plate 510, and the second holder 514 includes a copper plate 510 sandwiched between two heat radiation materials 509 and the Peltier device 512 for temperature controlling a remaining part of the wavelength conversion element 501 provided on the copper plate 510 by controlling the temperature of the copper plate 510. The Peltier device 511 of the first holder 513 and the Peltier device 512 of the second holder 514 are respectively connected to the controller 515 to be temperature-controlled by the controller 515.

The wavelength conversion element 501 of the present embodiment is arranged such that the portion in vicinity of an output surface 507 is made thinner than other portions as shown in FIG. 5. With this structure, it is possible to suppress an increase in temperature in vicinity of the output surface 507 of the wavelength conversion element 501 by effectively radiating heat from the portion in vicinity of the output surface.

Fourth Embodiment

Next, the fourth embodiment of the present invention is described. In the present embodiment, heat can be radiated effectively by forming the path of a fundamental wave in vicinity of the output surface closer to a holder so as to suppress an increase in temperature in vicinity of the output surface of the wavelength conversion element.

Figure 6:
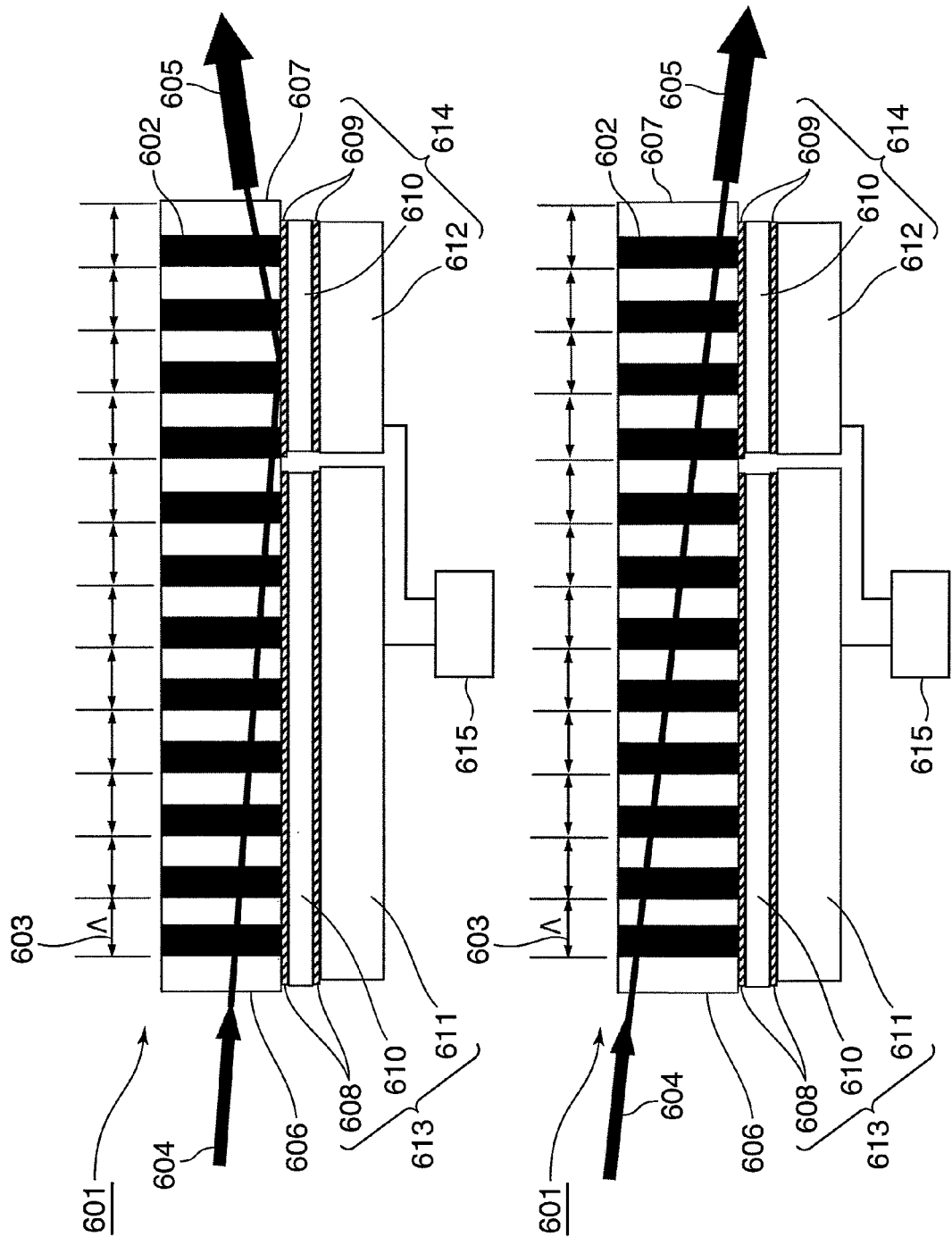
FIGS. 6A and 6B are cross-sectional views showing a schematic structure of a short wavelength light source according to a fourth embodiment of the present invention.

FIGS. 6A and 6B are cross-sectional views showing a schematic structure of a short wavelength light source according to the fourth embodiment of the present invention. In the short wavelength light source according to the present embodiment, a plurality of Peltier devices 611, 612 are provided in a propagation direction of a wavelength conversion element 601. The short wavelength light source according to the present embodiment is provided with the wavelength conversion element 601, a first holder 613, a second holder 614 and a controller 615 as shown in FIGS. 6A and 6B. The first holder 613 includes a copper plate 610 sandwiched between two heat radiation materials 608 and the Peltier device 611 for temperature controlling a part of the wavelength conversion element 601 provided on the copper plate 610 by controlling the temperature of the copper plate 610, and the second holder 614 includes a copper plate 610 sandwiched between two heat radiation materials 609 and the Peltier device 612 for temperature controlling a remaining part of the wavelength conversion element 601 provided on the copper plate 610 by controlling the temperature of the copper plate 610. The Peltier device 611 of the first holder 613 and the Peltier device 612 of the second holder 614 are respectively connected to the controller 615 to be temperature-controlled by the controller 615.

In the case of FIG. 6A, by reflecting a fundamental wave 604 on a substrate surface at a position where a SHG light output is 1.5 W or higher and power density is highest, heat generated by the absorption of generated green light (SHG) 605 can be radiated. As a result, a heat distribution can be suppressed effectively.

According to the structure of FIG. 6B, an SHG is output from the output surface 607 with an output power of 1.5 W or higher at position close to the substrate surface, and it is therefore possible to realize the similar heat radiation effect, thereby effectively suppressing a reduction in conversion efficiency and a reduction in output power.

Fifth Embodiment

Next, the fifth embodiment of the present invention is described. In the present embodiment, a heat radiation state is improved by increasing a surface area of a heat sink in vicinity of the output surface of the wavelength conversion element to suppress an increase in temperature in vicinity of the output surface.

Figure 7:
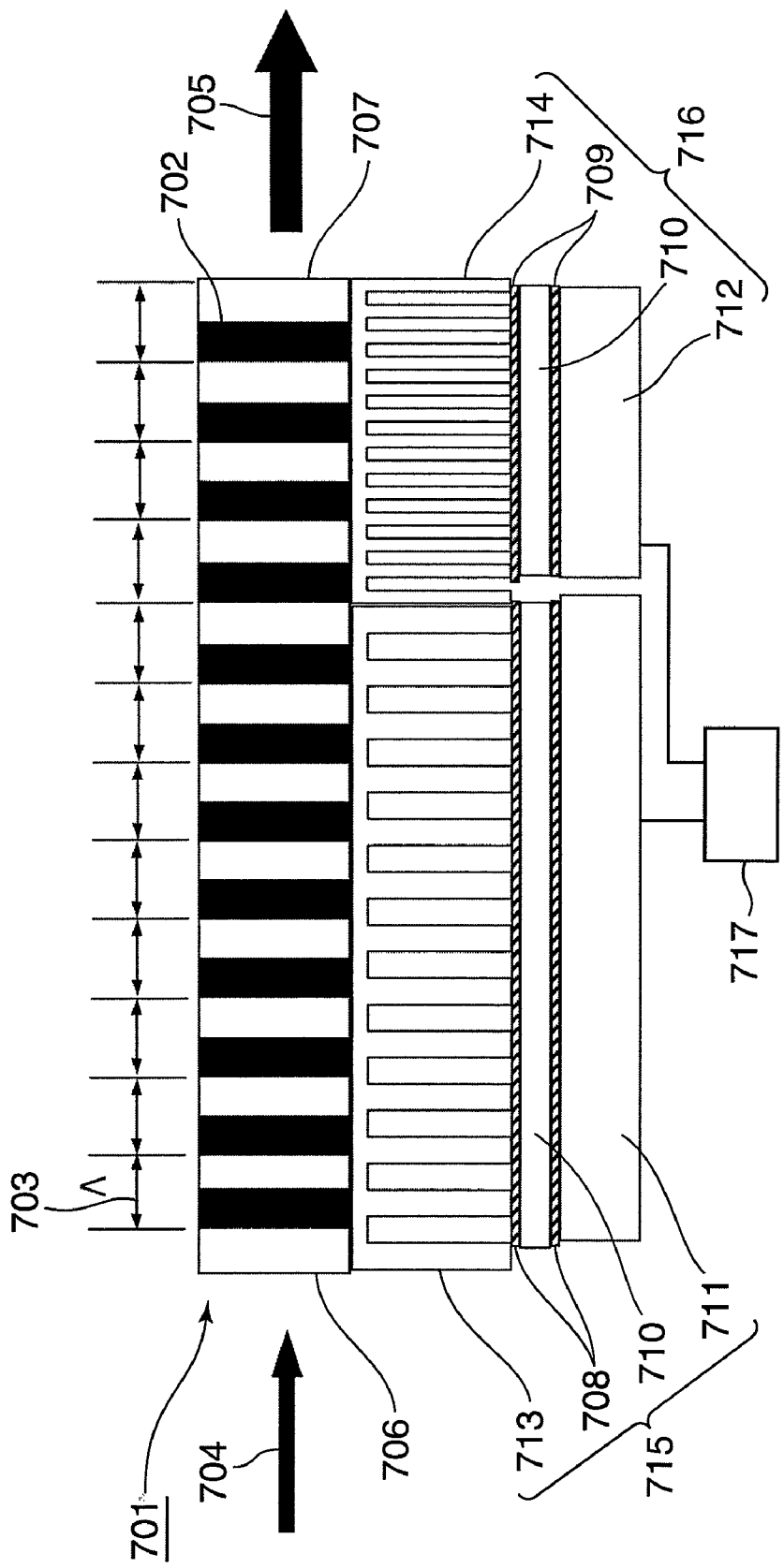
FIG. 7 is a cross-sectional view showing a schematic structure of a short wavelength light source according to a fifth embodiment of the present invention.

FIG. 7 is a cross-sectional view showing a schematic structure of a short wavelength light source according to the fifth embodiment of the present invention. In the short wavelength light source according to the present embodiment, a plurality of Peltier devices 711, 712 are provided in a propagation direction of a wavelength conversion element 701. The short wavelength light source according to the present embodiment is provided with the wavelength conversion element 701, a first holder 715, a second holder 716 and a controller 717 as shown in FIG. 7. The first holder 715 includes a copper plate 710 sandwiched between two heat radiation materials 708, the Peltier device 711 for temperature controlling a part of the wavelength conversion element 701 provided on the copper plate 710 by controlling the temperature of the copper plate 710 and a heat sink 713 having a surface area increased by attaching a plurality of radiation fins. The second holder 716 includes a copper plate 710 sandwiched between two heat radiation materials 709, the Peltier device 712 for temperature controlling a remaining part of the wavelength conversion element 701 provided on the copper plate 710 by controlling the temperature of the copper plate 710 and a heat sink 714 having a surface area increased by attaching a plurality of radiation fins. The Peltier device 711 of the first holder 715 and the Peltier device 712 of the second holder 716 are respectively connected to the controller 717 to be temperature-controlled by the controller 717.

According to the short wavelength light source of the present embodiment, the heat sinks 713, 714 are provided for radiating heat. Specifically, the heat sink 713 having a small surface area is adopted for a part from an incident end side where no heat is generated to an element intermediate portion. On the other hand, the heat sink 714 having a large surface area is adopted for a part in vicinity of the output surface where heat is generated. According to the foregoing structure, a heat bias in vicinity of the output surface can be solved, and the element temperature can be maintained, thereby suppressing a reduction in conversion efficiency and a reduction in output power.

Sixth Embodiment

Next, the sixth embodiment of the present invention is described. The present embodiment describes a short wavelength light source arranged so as to suppress an element temperature distribution by heating a part where a SHG power is not deteriorated so as to conform to temperature at a portion in vicinity of the output surface of the wavelength conversion element where a SHG output and a SHG power density are maximized.

FIG. 8A is a cross-sectional view showing a schematic structure of the short wavelength light source according to the sixth embodiment of the present invention. In the short wavelength light source according to the present embodiment, a heater 809 is provided in a part of a wavelength conversion element 801 where a SHG power is not to be deteriorated. The short wavelength light source according to the present embodiment is provided with the wavelength conversion element 801, a copper plate 808 sandwiched between two heat radiation materials, the heater 809 for heating a part of the wavelength conversion element 801 provided on the copper plate 808 by heating the copper plate 808 and a heater controller 813 for controlling the heating by the heater 809.

The wavelength conversion element 801 of the present embodiment is arranged such that a plurality of periodically poled regions 802 are formed in a Mg-doped $LiNbO_3$ Z-substrate. The features and the structure of the wavelength conversion element 801 are the same as those of the first embodiment, and therefore explanations thereof shall be omitted here. As a fundamental wave 804, a light (Nd:YAG laser) having a wavelength of 1064 nm is adopted. This fundamental wave 804 is subjected to the wavelength conversion, and is converted into a green light (SHG) having a wavelength of 532 nm. In order to suppress a temperature distribution which is generated at the time of a high output and which has a center in vicinity of the output surface, the other portions than the portion in vicinity of the output surface can be heated by the heater 809.

Using the short wavelength light source according to the present embodiment shown in FIG. 8A, an experiment was conducted on a high output characteristic of the SHG. When the heater 809 arranged in vicinity of the incident end surface was not heated, a deterioration of the square-law characteristic, output instability and a conversion efficiency reduction occurred at a SHG output of 1.5 W or higher. On the other hand, when the element was heated by the heater 809, the deteriorated square-law characteristic was solved and high conversion efficiency was realized, whereby a stable high output and a beam profile with high quality could be obtained. The conversion efficiency suddenly decreased in the conventional light source also at the time of a green output of 2.5 W, but the temperature distribution of the element generated in the propagation direction was eliminated to suppress a conversion efficiency reduction and an output reduction and to obtain a stable output characteristic by heating the element incident end by means of the heater 809.

Although the heater 809 was arranged for heating in the part where the SHG power is not deteriorated (part where no temperature increase by the SHG absorption occurs) in order to the reduce the temperature distribution generated in the light propagation direction of the wavelength conversion element in the present embodiment, the heating method is not limited to this. For example, as shown in FIG. 8B, light (e.g. infrared light) 810 in such a wavelength range as to be absorbed by the wavelength conversion element is irradiated to a part where the SHG power is not deteriorated to generate heat, whereby the temperature distribution of the overall wavelength conversion element can be eliminated. The elimination of the temperature distribution can be optimized by adjusting the intensity of light to be irradiated. The infrared light 810 may be irradiated by arranging an infrared light source 811 above the part of the wavelength conversion element where the SHG power is not deteriorated and controlling the infrared light source 811 by means of an infrared light source controller 812.

The dependency of the power P (deterioration) on the wavelength of the SHG is shown in FIG. 9. In the short wavelength light sources according to the foregoing first to sixth embodiments, P (deterioration) was around 1.5 W when the SHG wavelength was in a range of from 500 nm to 550 nm, about 0.2 W when the SHG wavelength was in a range of from 400 nm to 450 nm and about 0.05 W when the SHG wavelength was in a range of from 340 nm to 400 nm.

In the short wavelength light sources according to the above first to six embodiments, the MgO-doped LiNbO$_3$ Z-substrate formed with the periodically poled regions was used as the wavelength conversion element. Besides, a MgO-doped LiTaO$_3$ substrate, a similar substrate having a stoichiometric composition or the like may be used. Other than Mg-doped substrates, a similar phenomenon can be expected when adopting In, Zn or Sc-doped substrates. It is therefore possible to obtain the same effect as achieved from the foregoing first to sixth embodiments.

The short wavelength light sources according to the first to sixth embodiments are particularly effective for the wavelength conversion in the case of a fundamental wave having a phase matched wavelength of 1200 nm or shorter. Since the phenomenon described in the foregoing first to sixth embodiments results from heat generated by absorbing harmonic wave induced by the ultraviolet light as generated, it notably appears in a wavelength range where ultraviolet light is generated. In other words, these embodiments are effective for converting a fundamental wave having a wavelength of 1200 nm or shorter to generate sum frequency wave of the fundamental wave and the harmonic wave, having a wavelength of 400 nm or shorter.

The harmonic absorption induced by the generation of ultraviolet light is confirmed to be notable when a fundamental wave power is 10 W or higher or a harmonic power is 3 W or higher. Thus, the short wavelength light sources of the first to sixth embodiments are effective in the case of a fundamental wave or a harmonic wave of such high power.

High-luminance laser image forming apparatuses can be realized using the short wavelength light sources according to the foregoing first to sixth embodiments. High-luminance laser image forming apparatuses include, for example, rear projection image forming apparatuses for modulating high-output laser light by a spatial light modulation element and projecting the resulting laser light onto a screen and liquid crystal televisions using high-output laser light sources as backlights. According to the short wavelength light sources of the first to sixth embodiments, a stable output characteristic can be realized at the time of a high output power, thereby realizing clear video images of high luminance free from degradation.

In the foregoing first to sixth embodiments, explanations have been given through the case where the refractive index increases by heat generation and the phase matching condition is displaced to reduce the conversion efficiency (output). However, a reduction in the conversion efficiency (output) can be suppressed by compensating for the displacement in the phase matching condition by carrying out a temperature control also in the case where a reduction in conversion efficiency (output) occurs otherwise due to a displacement in phase matching condition resulting from changes in refractive index in the crystal changes upon the incidence of laser light. Namely, a reduction in conversion efficiency can be suppressed by carrying out the temperature control to compensate for a displacement in phase matching condition, and it is therefore possible to achieve the same effect as achieved from the foregoing first to sixth embodiments.

As described above, the short wavelength light source in accordance with any one of the foregoing first to sixth embodiments of the present invention includes the wavelength conversion element made of the nonlinear optical material for converting a fundamental wave into a second harmonic wave and the holders for supporting the wavelength conversion element, wherein the short wavelength light source is arranged such that the wavelength conversion element includes an incident portion, on which the fundamental wave is incident, and an output portion, from which the second harmonic wave is outputted. The foregoing short wavelength light source is further arranged such that at least a specific region in vicinity of the output portion of the wavelength conversion element has lower heat resistance than that of the other regions, whereby it is possible to keep constant the temperature distribution in the element caused by heat generated by absorbing harmonic wave induced by ultraviolet light generated by the interaction of the fundamental wave incident into the crystal and the wavelength converted harmonic wave. As a result, a reduction in conversion efficiency from the fundamental wave into the harmonic wave can be maintained, and a light output and a beam profile can be maintained under stable conditions, thereby ensuring the reliability of the laser light source.

Seventh Embodiment

Figure 19:
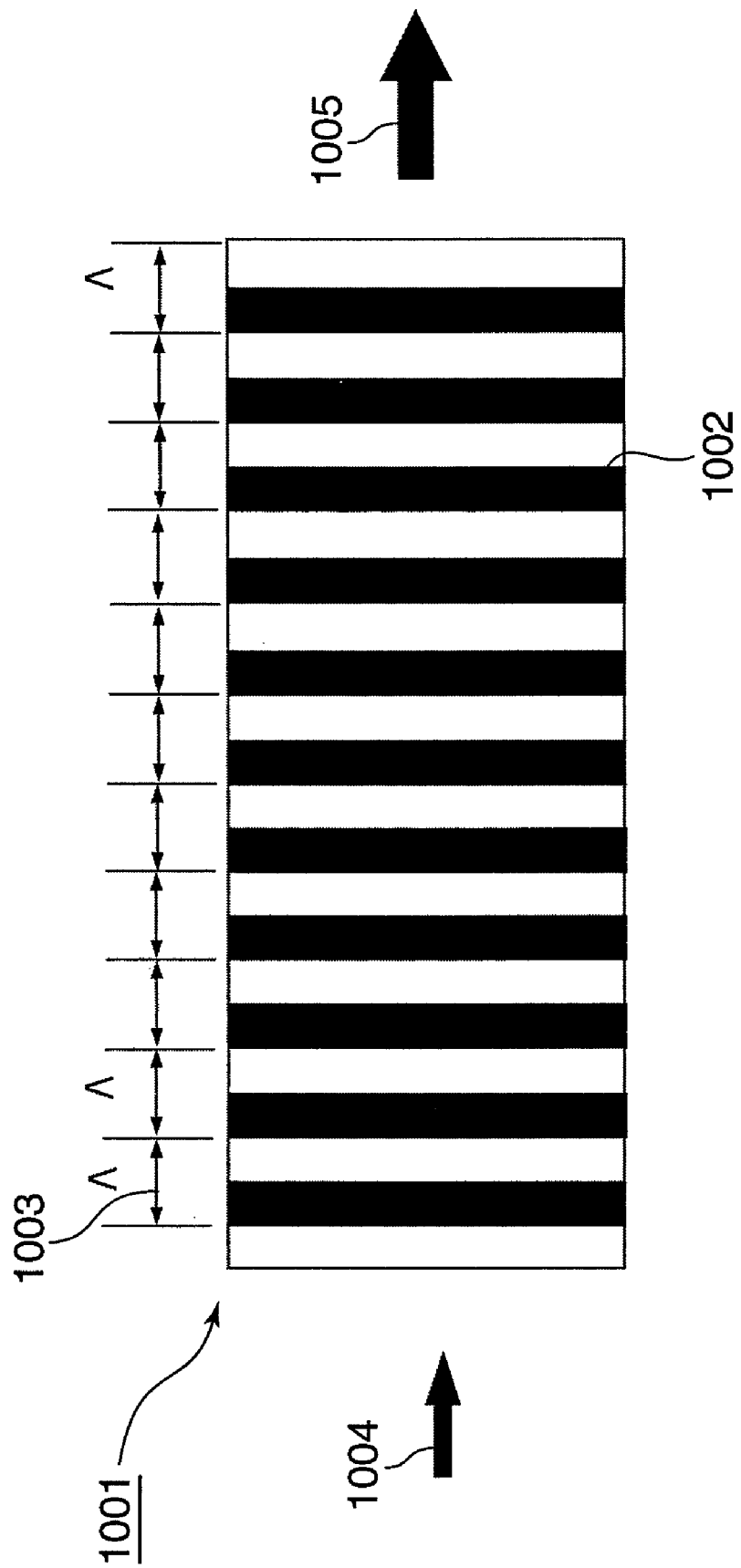
FIG. 19 is a cross-sectional view showing a schematic structure of another conventional short wavelength light source.

Next, the seventh embodiment of the present invention is described. Firstly, instability of the output of the wavelength conversion element is described as a background of the present embodiment. FIG. 19 shows a schematic structure of another conventional short wavelength light source. A wavelength conversion element 1001 of FIG. 19 is a bulk-type wavelength conversion element having a periodically poled structure, and an output of a second harmonic (SHG) 1005 increases in proportion to the square of a fundamental wave 1004 in the case of converting the fundamental wave 1004 into the SHG 1005. However, upon exceeding a specified SHG output, a phenomenon in which the output of the SHG 1005 largely decreased from a square-law characteristic was observed similar to the wavelength conversion element 1201 shown in FIG. 12.

Upon examining the cause of this reduction, it was found out that a THG as a sum frequency wave of the fundamental wave 1004 and the SHG 1005 was generated when the wavelength conversion element 1001 converted the fundamental wave 1004 into the SHG 1005, the absorption of SHG light by the wavelength conversion element 1001 occurred due to the generation of this THG and a phase matching condition of the wavelength conversion element 1001 was disturbed by heat generation caused by this absorption similar to the case of the wavelength conversion element 1201 of FIG. 12. Thus, it was revealed that heat generation by the absorption of the SHG 1005 became notable and the phase matching condition did not hold in an area where the intensity of the THG exceeded a predetermined value, thereby reducing the conversion efficiency of the wavelength conversion element 1001.

Figure 13:
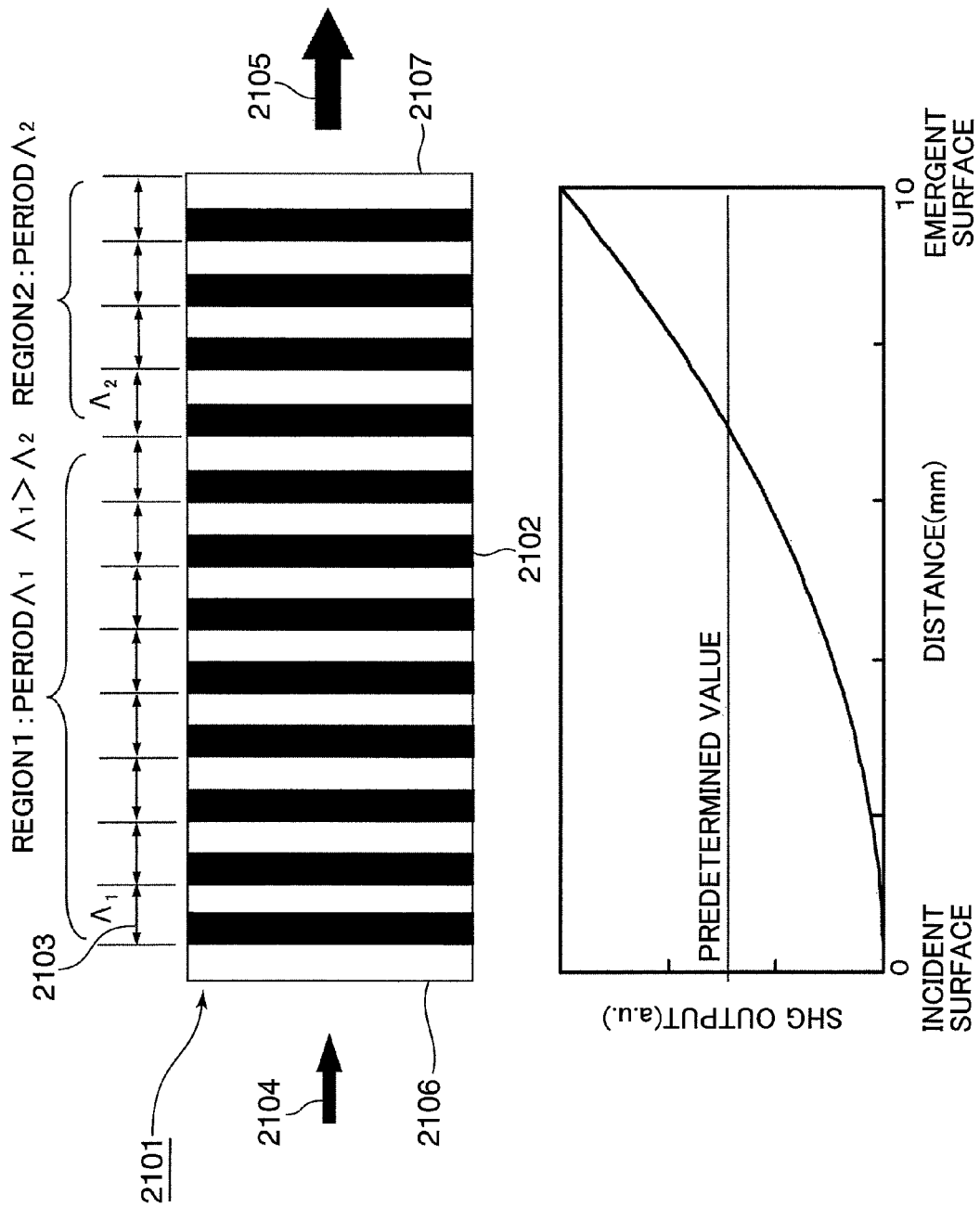
FIG. 13A is a cross-sectional view showing a schematic structure of a short wavelength light source according to a seventh embodiment of the present invention and FIG. 13B is a graph showing a relationship between a distance from an incident surface of a wavelength conversion element and a SHG output.

The present embodiment is achieved based on the foregoing phenomenon and proposes such a periodically poled structure to compensate for the cause of heat generated by the SHG absorption. FIG. 13A is a cross-sectional view showing a schematic structure of a short wavelength light source according to the seventh embodiment of the present invention.

In the short wavelength light source according to the present embodiment, a fundamental wave 2104 is incident on an incident surface 2106 of a wavelength conversion element 2101 and is converted into a SHG 2105 by periodically poled regions 2102, and the SHG 2105 is emitted from an output surface 2107.

FIG. 13B shows a relationship between a distance from an incident surface 2106 of the wavelength conversion element 2101 of FIG. 13A and a SHG output. As shown in FIG. 13B, the intensity of the SHG 2105 gradually increases in the wavelength conversion element 2101 and is maximized at the output surface 2107. In the short wavelength light source according to the present embodiment, poling periods 2103 are shorter in a region where the intensity of the SHG 2105 is above a predetermined value, i.e. in a region 2 than in a region 1 as shown in FIG. 13A. Specifically, the poling periods 2103 are Λ1 in the region 1 where the intensity of the SHG 2105 is equal to or below the predetermined value while being Λ2 smaller than Λ1 in the region 2 where the intensity of the SHG 2105 is above the predetermined value.

In other words, in the short wavelength light source according to the present embodiment, the periodically poled structure of the wavelength conversion element 2101 has different shorter poling periods in the region where intensity Pshg of the SHG 2105>P (deterioration) in the wavelength conversion element 2101 shorter than in the other part in the case of outputting the SHG having a predetermined value Pshg.

An intensity distribution of the SHG 2105 in the wavelength conversion element 2101 gradually increases toward the output surface 2107 from the values of power, beam diameter and beam quality of the incident fundamental wave as shown in FIG. 13B. Based on this characteristic, the poling periods 2103 in the wavelength conversion element 2101 need to be designed to be shorter in the region 2 where the intensity of the SHG 2105 exceeds P (deterioration) in the wavelength conversion element 2101 than in the region 1. In other words, the poling periods are designed to establish a relationship of Λ1>Λ2 if Λ1 are the periods in the region 1 not exceeding P (deterioration) and Λ2 are the periods in the region 2 exceeding P (deterioration).

Here is described a case where the fundamental wave 2104 having a wavelength of 1064 nm is converted into the SHG 2105 having a wavelength of 532 in the wavelength conversion element 2101 made of MgO-doped LiNbO$_3$ and having a periodically poled structure. When an input of the fundamental wave 2104 is 10 W, a focus diameter of the fundamental wave 2104 is ϕ33 μm and a beam quality of the fundamental wave 2104 has a substantially ideal Gaussian distribution, the intensity of the SHG 2105 exceeds 1.5 W upon advancing about 7 mm from the incident surface 2106 of the element when the length of the wavelength conversion element 2101 is 10 mm. Accordingly, by slightly shortening the poling periods 2103 after a position of 3 mm from the output surface 2107 in the element length as an optimal structure of the wavelength conversion element 2101, the conversion efficiency of the wavelength conversion element 2101 can be remarkably increased. Specifically, the poling periods Λ1 of the region 1 were set to 6.97 μm and the poling periods Λ2 of the region 2 were set to 6.969 μm.

The structure of the present embodiment is important if a required maximum output exceeds the value of P (deterioration) upon determining a maximum output of the short wavelength light source. In the short wavelength light source, the length and conversion efficiency of the wavelength conversion element and the fundamental wave power required for the maximum output are obtained from the power and beam quality of the fundamental wave light source. Under these conditions, an intensity distribution of the SHG in the wavelength conversion element in the case of generating a maximum output is obtained and the periodically poled structure of the wavelength conversion element is determined. By setting the poling periods in the region where the SHG intensity exceeds P (deterioration) shorter than in the other region of the wavelength conversion element, the conversion efficiency is improved by compensating for the influence by a change in temperature caused by absorption.

Figure 14:
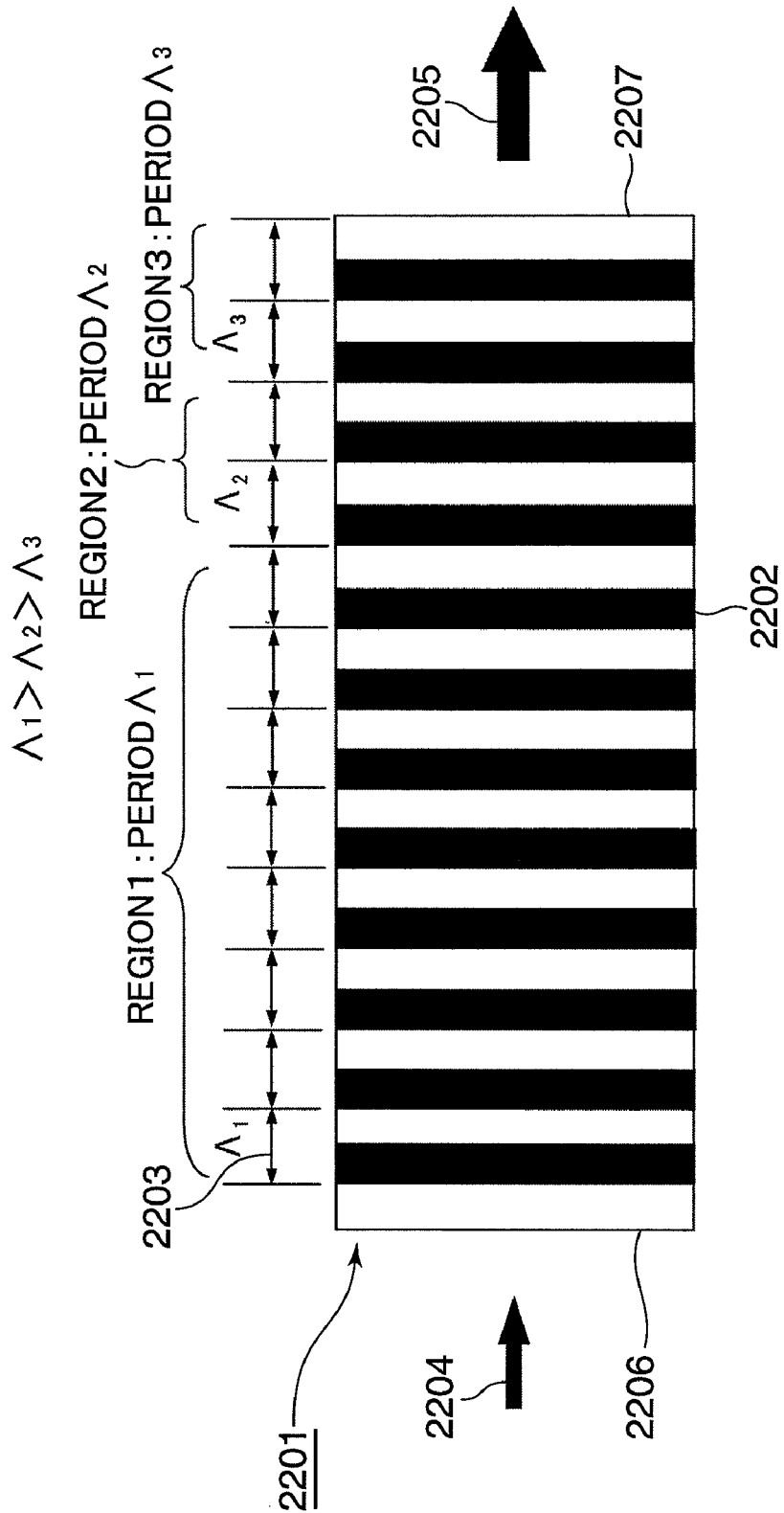
FIG. 14 is a cross-sectional view showing another schematic structure of the short wavelength light source according to the seventh embodiment of the present invention.

Although the periods of the poled structure in the region 2 have a fixed value in the present embodiment, it is preferable to decrease the periods toward the output surface. This is because the temperature distribution in the wavelength conversion element also increases toward the output surface by gradually increasing the intensity of the SHG toward the output surface in the wavelength conversion element as shown in FIG. 13B. For example, if the periods are changed by setting three regions as shown in FIG. 14, it is possible to further suppress reduction in output power at the time of a high output as compared with the wavelength conversion element having the fixed periods in the region 2 shown in FIG. 13A.

Figure 15:
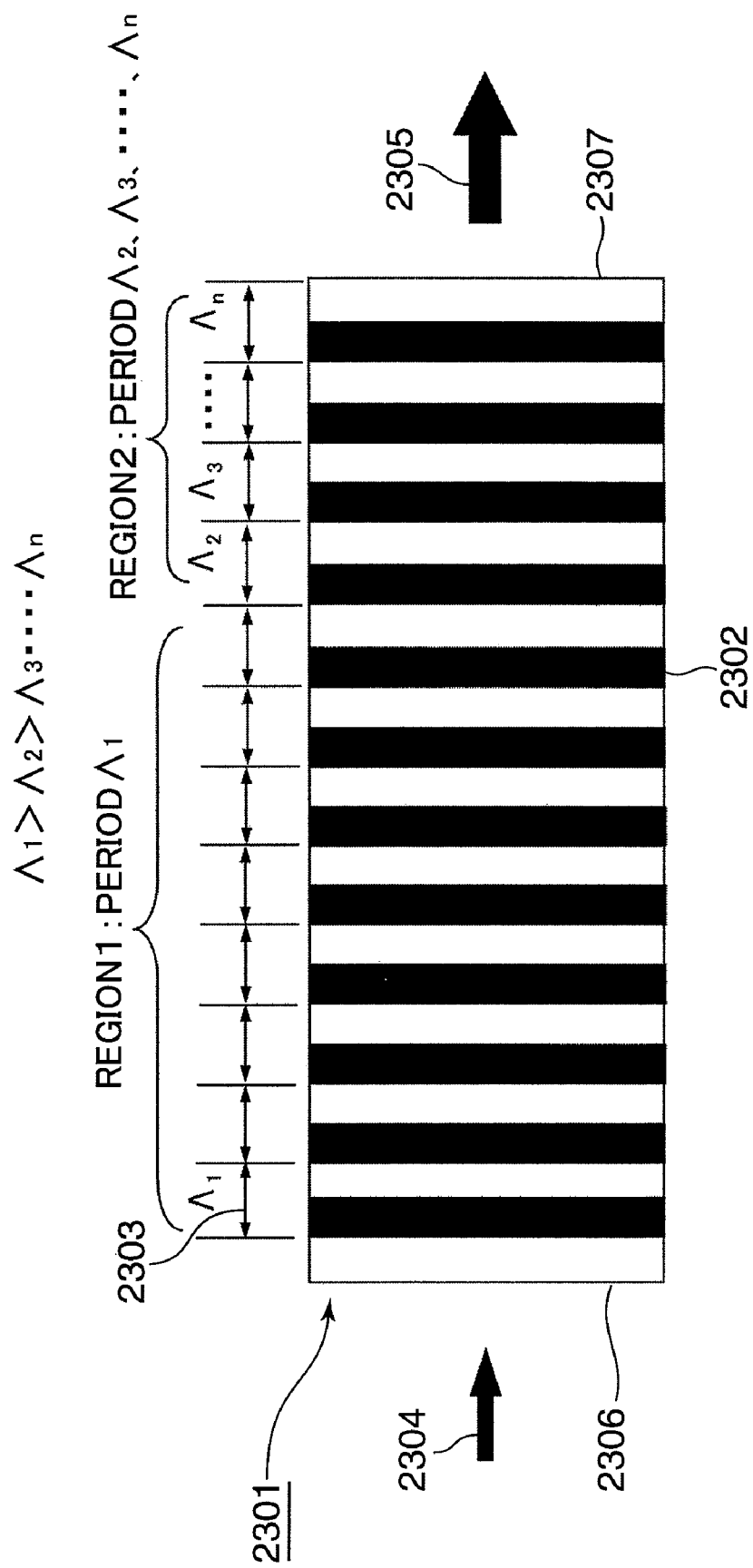
FIG. 15 is a cross-sectional view showing still another schematic structure of the short wavelength light source according to the seventh embodiment of the present invention.

It is further preferable to gradually decrease the periods of the poled structure in the region 2 toward the output surface as shown in FIG. 15. It is also preferable that the poling periods are gradually decreased toward the output surface to completely suppress the influence of also increasing the temperature distribution in the element toward the output surface by gradually increasing the intensity of the SHG toward the output surface in the wavelength conversion element.

The short wavelength light source of the present embodiment is preferably arranged such that the length of the region 2 is set equal to or shorter than the overall length of the element. In the case of a bulk-type wavelength conversion element, a fundamental wave focusing characteristic for maximizing the conversion efficiency is obtained when a focal point is located in the center of a crystal and a beam diameter of the fundamental wave is maximized at the opposite ends of the crystal. At this time, the intensity of a SHG in the element at an output portion is about three times as high as the power in a central part of the element. Crystal destruction by light absorption was found to occur if a maximum output was three times or more as large as P (deterioration) at which the conversion efficiency was deteriorated. Thus, an output light increase cannot be obtained even if the length of the region 2 is set equal to or longer than half the element length. For the reason set forth above, it is preferable that the length of the region 2 be set equal to or shorter than the element length.

Eighth Embodiment

Figure 16:
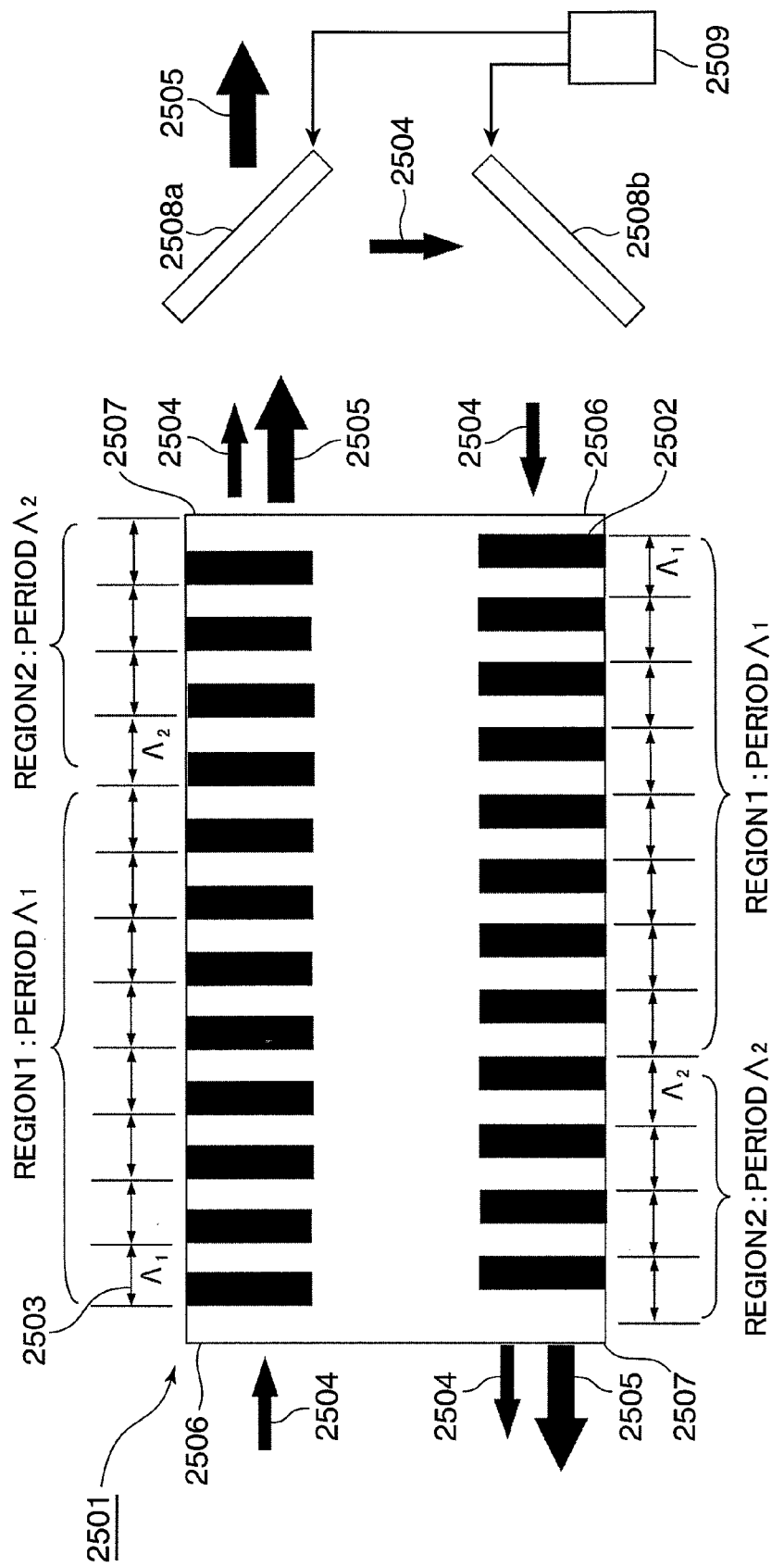
FIG. 16 is a cross-sectional view showing a schematic structure of a short wavelength light source according to an eighth embodiment of the present invention.

Next, the eighth embodiment of the present invention is described. FIG. 16 is a cross-sectional view showing a schematic structure of a short wavelength light source according to the eighth embodiment of the present invention.

In the short wavelength light source according to the present embodiment, a fundamental wave 2504 is incident on an incident surface 2506 of a wavelength conversion element 2501 and converted into a SHG 2505 by the periodically poled regions 2502, and the SHG 2505 is emitted from an output surface 2507 as shown in FIG. 16. Particularly, in the present embodiment, the fundamental wave 2504 passes a periodically poled structure twice as being reflected by mirrors 2508a, 2508b unlike the structure of the seventh embodiment, for example, wherein the fundamental wave 2504 passes the wavelength conversion element only once. Reflection directions of the respective mirrors 2508a, 2508b are controlled by a mirror controller 2509.

A first pass and a second pass of the fundamental wave 2504 through the wavelength conversion element 2501 are sufficiently distanced, so that temperature increases caused by absorption and the like at the time of a high output do not influence each other. In FIG. 16, the intensity of the SHG 2505 is maximized in vicinity of an output surface 2507 through which the fundamental wave 2504 on the first passage path passes before the reflection by the mirror 2508a and in vicinity of the output surface 2507 through which the fundamental wave 2504 passes in the second pass after being reflected from the mirror 2508b. Also in the short wavelength light source of the present embodiment, poling periods are shorter in regions where the intensity of the SHG 2505 is above a predetermined value, i.e. in regions 2 than in regions 1 similar to the above seventh embodiment.

Specifically, poling periods 2503 in the wavelength conversion element 2501 are designed to be shorter in the regions 2 where the intensity of the SHG 2505 is above P (deterioration) than in the regions 1 in the wavelength conversion element 2501. In other words, the poling periods are designed to establish a relationship of $\Lambda1 > \Lambda2$ if $\Lambda1$ are the periods in the regions 1 not exceeding P (deterioration) and $\Lambda2$ are the periods in the regions 2 exceeding P (deterioration) during both first and second passes of the fundamental wave.

In the case where the fundamental wave 2504 having a wavelength of 1064 nm is converted into the SHG 2505 having a wavelength of 532 in the wavelength conversion element 2501 of the present embodiment, when an input of the fundamental wave 2504 is 10 W, a focus diameter of the fundamental wave 2504 is $\phi33$ μm and a beam quality of the fundamental wave 2504 has a substantially ideal Gaussian distribution, the intensity of the SHG 2505 exceeds 1.5 W when the fundamental wave advances about 7 mm from the incident surface 2506 of the element during the first passage of the fundamental wave when the length of the wavelength conversion element 2501 is 10 mm. Accordingly, by slightly shortening the poling periods after a position of 3 mm from the output surface 2507 in the element length as an optimal structure of the wavelength conversion element 2501, the conversion efficiency of the wavelength conversion element 2501 can be remarkably increased. During the second passage of the fundamental wave 2504, an input power of the fundamental wave 2504 decreases due to pump depression and loss by an optical system including the mirrors 2508a, 2508b. Thus, the region where the intensity of the SHG exceeds 1.5 W shifts toward the output surface 2507. Similar to the first passage of the fundamental wave 2504 through the wavelength conversion element, the conversion efficiency of the wavelength conversion element 2501 during the second passage can be remarkably increased by shortening the periods in vicinity of the output surface 2507 of the element. In this way, the deterioration of the conversion efficiency was suppressed and an SHG output approximately twice as large as the one given by the output characteristic of FIG. 3 could be obtained in response to the fundamental wave input of 10 W.

Figure 17:
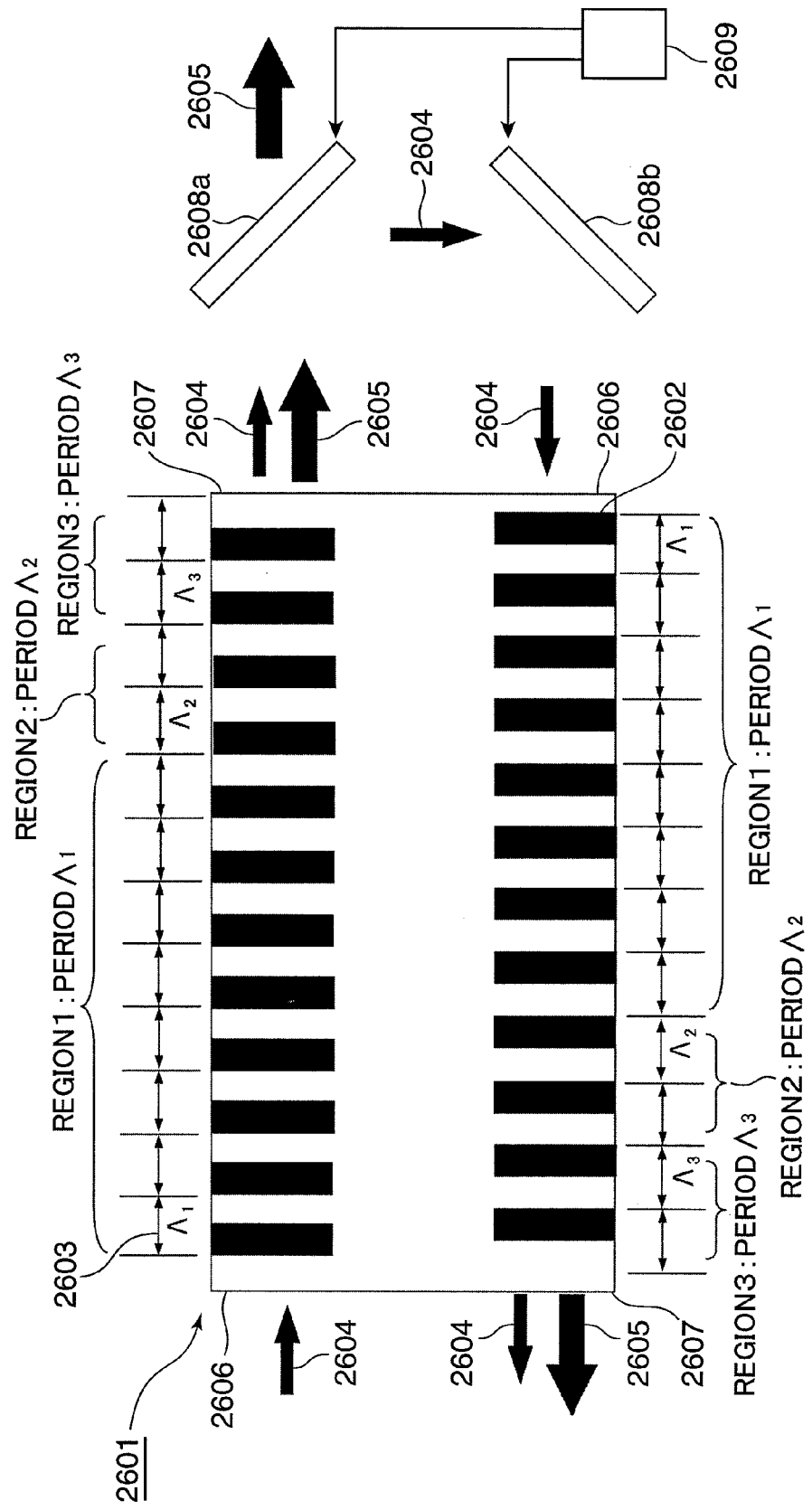
FIG. 17 is a cross-sectional view showing another schematic structure of the short wavelength light source according to the eighth embodiment of the present invention.

Although the periods of the poled structures in the regions 2 have a fixed value both on the first and second passages of the fundamental wave in the present embodiment, it is preferable to decrease the periods toward the output surfaces. This is because temperature distributions in the wavelength conversion element also increase toward the output surfaces by gradually increasing the intensity of the SHG toward the output surfaces in the wavelength conversion element as shown in FIG. 13B. For example, if the periods are changed in three regions as shown in FIG. 17, an output reduction can be further reduced at the time of a high output as compared with the wavelength conversion element having the fixed periods in the regions 2.

Figure 18:
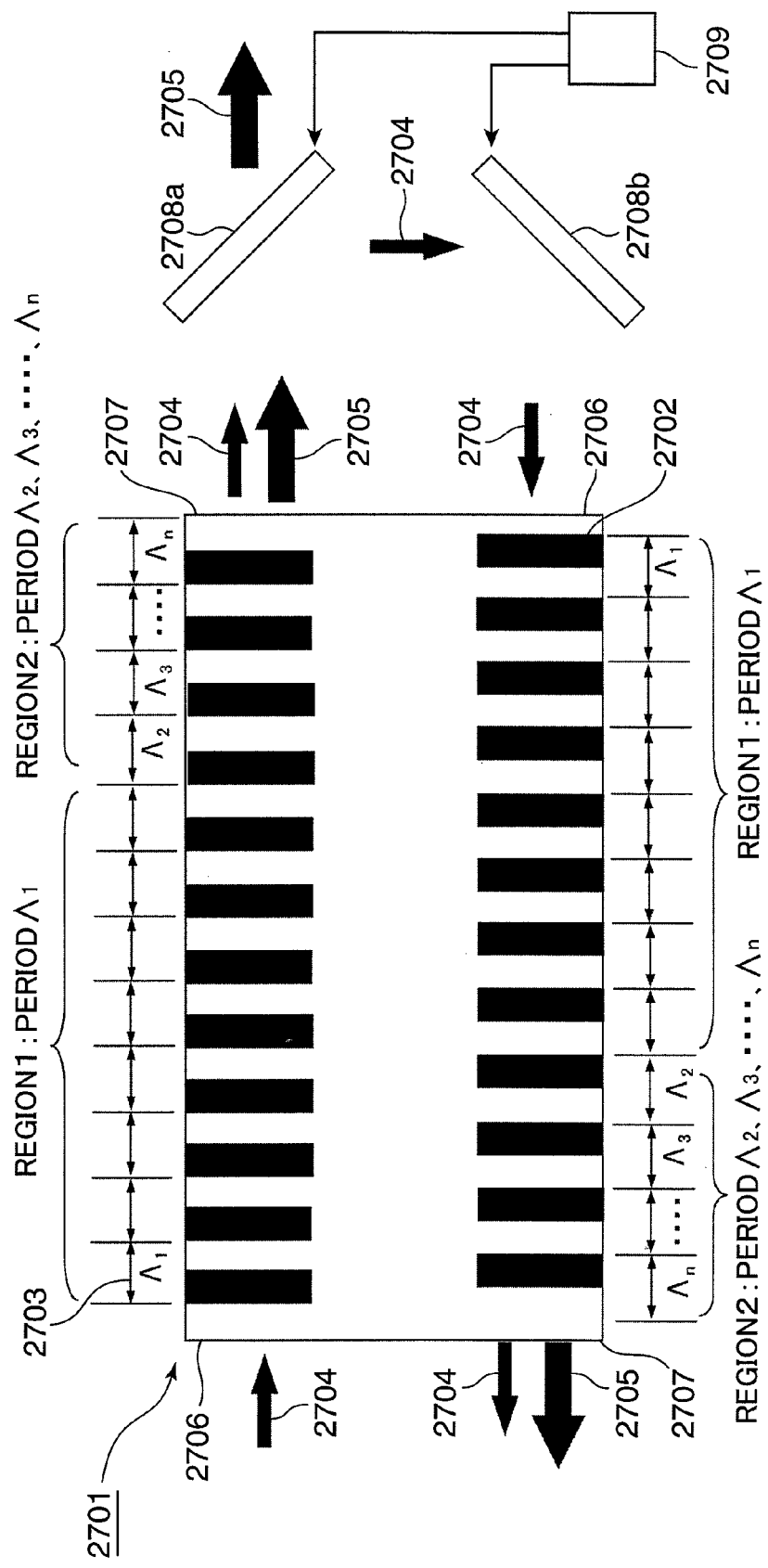
FIG. 18 is a cross-sectional view showing still another schematic structure of the short wavelength light source according to the eighth embodiment of the present invention.

It is further preferable to gradually decrease the periods of the poled structure in the regions 2 toward the output surfaces as shown in FIG. 18. The poling periods are preferably gradually decreased toward the output surfaces to completely suppress the influence of also increasing the temperature distributions in the element toward the output surfaces by gradually increasing the intensity of the SHG toward the output surfaces in the wavelength conversion element.

In the short wavelength light sources according to the seventh and eighth embodiments, the length of the region 2 is preferably equal to or shorter than the overall length of the element. In the case of a bulk-type wavelength conversion element, a fundamental wave focusing characteristic for maximizing conversion efficiency is obtained when a focal point is located in the center of a crystal and a beam diameter of the fundamental wave is maximized at the opposite ends of the crystal. At this time, the intensity of a SHG in the element at an output portion is about three times as high as power in a central part of the element. Crystal destruction by light absorption was found to occur if a maximum output was three times or more as large as P (deterioration) at which the conversion efficiency was deteriorated. Thus, an output light increase cannot be obtained even if the length of the region 2 is set equal to or longer than half the element length. Therefore, it is preferable to set the length of the region 2 equal to or shorter than the element length.

The dependency of the power P (deterioration) power on the wavelength of the SHG is shown in FIG. 9. In the short wavelength light sources according to the above seventh and eighth embodiments, P (deterioration) was around 1.5 W when the SHG wavelength was in a range of from 500 nm to 550 nm. In the case of emitting a SHG having this wavelength, the conversion efficiency could be increased by setting shorter poling periods in the region(s) where a SHG power exceeds 1.5 W in the wavelength conversion element. P (deterioration) was around 0.2 W when the SHG wavelength was in a range of from 400 nm to 450 nm and about 0.05 W when the SHG wavelength was in a range of from 340 nm to 400 nm.

In the short wavelength light sources according to the above seventh and eighth embodiments, the MgO-doped LiNbO$_3$ Z-substrate formed with the periodically poled structure regions was used as the wavelength conversion element. Other than MgO-doped LiTaO$_3$ substrate, a similar substrate having a stoichiometric composition or the like may be used. Other than Mg-doped substrates, a similar phenomenon can be expected when adopting. In, Zn or Sc-doped substrates. It is therefore possible to obtain the same effect as achieved from the foregoing seventh and eighth embodiments can be obtained.

The short wavelength light sources according to the above seventh and eighth embodiments are particularly effective for wavelength conversion in the case of a fundamental wave having a phase matched wavelength of 1200 nm or shorter. Since the phenomenon described in the above seventh and eighth embodiments results from heat generated by absorbing harmonic wave induced by the ultraviolet light as generated, it notably appears in a wavelength range where ultraviolet light is generated. In other words, these embodiments are effective for converting a fundamental wave having a wavelength of 1200 nm or shorter to generate sum frequency wave of the fundamental wave and the harmonic wave, having a wavelength of 400 nm or shorter.

The harmonic absorption induced by the generation of ultraviolet light is confirmed to be notable when a fundamental wave power is 10 W or higher or a harmonic power is 3 W or higher. Thus, the short wavelength light sources of the above seventh and eighth embodiments are effective in the case of a fundamental wave or a harmonic wave of such high power.

High-luminance laser image forming apparatuses can be realized using the short wavelength light sources according to the above seventh and eighth embodiments. High-luminance laser image forming apparatuses include, for example, rear projection image forming apparatuses for modulating high-output laser light by a spatial light modulation element and projecting the resulting laser light onto a screen and liquid crystal televisions using high-output laser light sources as backlights. By using the short wavelength light sources according to the above seventh and eighth embodiments, a stable output characteristic can be realized at the time of a high output, wherefore clear video images having high luminance and free from degradation can be provided.

Although the refractive index increases by heat generation and the phase matching condition is displaced to reduce the conversion efficiency (output) in the above seventh and eighth embodiments, a reduction in the conversion efficiency (output) can be suppressed by compensating for the displacement in the phase matching condition by changing the poling periods even if the refractive index in the crystal changes upon the incidence of laser light and the phase matching condition is displaced to reduce the conversion efficiency (output). It is therefore possible to achieve the effect as achieved from the seventh and eighth embodiments can be obtained.

As described above, the short wavelength light source according to either one of the seventh and eighth embodiments of the present invention is provided with the wavelength conversion element for converting a fundamental wave into a second harmonic, wherein the wavelength conversion element is made of a bulk nonlinear optical material having a periodically poled structure and includes an incident portion, on which the fundamental wave is incident, and an output portion, from which the second harmonic is emitted, and a reduction of conversion efficiency from the fundamental wave into the harmonic wave is suppressed by changing the periods of the poled structure at least in a part of the region in vicinity of the output portion of the wavelength conversion element using a temperature distribution in the element caused by heat generated by harmonic absorption induced by ultraviolet light generated by the interaction of the fundamental wave incident into the crystal and the wavelength converted harmonic wave. As a result, a reduction in conversion efficiency from the fundamental wave into the harmonic wave can be maintained, and a light output and a beam profile can be maintained under stable conditions, thereby ensuring the reliability of the laser light source.

Ninth Embodiment

Next, the ninth embodiment of the present invention is described. Firstly, a reduction in conversion efficiency and output instability of a wavelength conversion element are described as a background of the present embodiment. Generally, the wavelength conversion by a bulk type wavelength conversion element has low conversion efficiency and an internal resonator type in which a wavelength conversion element is inserted in a resonator of a solid-state laser has been conventionally a mainstream. In contrast, a construction for wavelength converting a fundamental wave by a single pass was enabled by using a highly nonlinear optical material such as $MgO:LiNbO_3$ having a periodically poled structure, $MgO:LiTaO_3$ or $KTiOPO_4$. A fundamental wave light source and a focusing optical system are required to have peculiar characteristics to increase the efficiency of single-pass wavelength conversion.

What are required for the fundamental wave light source are a good beam quality and a narrower wavelength spectrum. The beam quality is obtained as a characteristic expressed by $M^2$ measured by the focusing characteristic and approximate to a Gaussian distribution. $M^2=1$ in the case of conforming to the Gaussian distribution, but a characteristic of $M^2<1.2$ is required for highly efficient conversion. The beam diameter approximates to a right circle and the wavelength spectrum depends on the element length, but needs to have a narrow band characteristic of 0.1 nm or smaller. When a focus spot is located in the center of an interaction length and a focusing characteristic expressed by the following equation (1) is satisfied, the conversion efficiency can be improved to the maximum.

$$L\times\lambda/(2\pi\times n\times\omega_0^2)=2.84 \quad (1)$$

Here, L indicates the length of the wavelength conversion element, $\omega_0$ indicates $1/e^2$ (e is a base of natural logarithm) focused spot radius, $\lambda$ indicates fundamental wave wavelength and n indicates refractive index for the fundamental wave.

Under these conditions, highly efficient wavelength conversion was enabled and an output of 2 W was obtained at conversion efficiency exceeding 30% by a single-pass conversion. In such a construction, in the case of converting the fundamental wave 1204 into the second harmonic (SHG) 1205 in the bulk-type wavelength conversion element 1201 having the periodically poled structure shown in FIG. 12, the SHG output increases in proportion to the square of the fundamental wave. However, a phenomenon in which the SHG output largely decreased from the square-law characteristic upon exceeding a predetermined value was observed.

Upon examining the cause of this reduction, it was found out that a THG as a sum frequency wave of the fundamental wave 1204 and the SHG 1205 was generated, the absorption of the SHG light occurred due to the influence of the generation of this THG and a phase matching condition was disturbed by heat generation caused by this absorption.

Figure 24A:
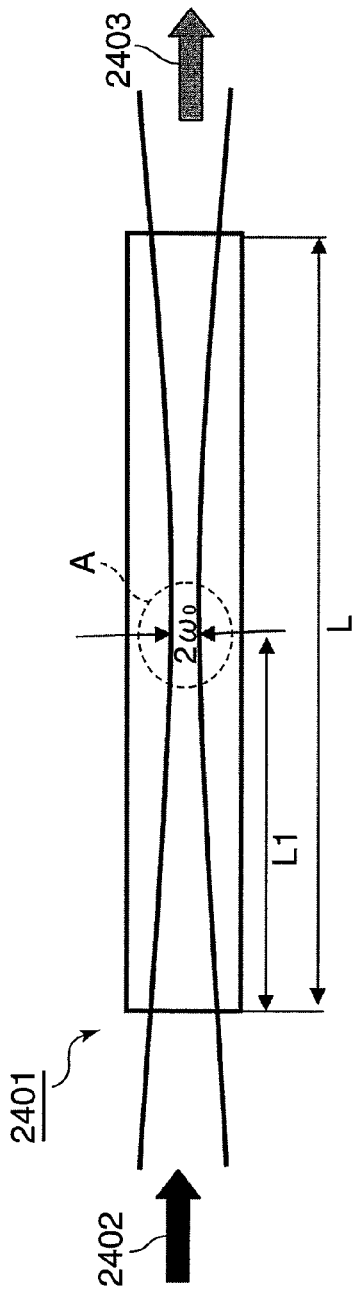
FIG. 24A is a diagram showing a beam path in a wavelength conversion element and FIG. 24B is a graph showing a heating value distribution in the wavelength conversion element.

As a result of a more detailed examination, it was revealed by an experiment and an analysis that an amount of heat generation in the beam path of the SHG light was obtained from the product of the power densities of the SHG and the THG since the absorption of the SHG light increases in proportion to the intensity of the THG. This result is shown in FIG. 24A. It was also revealed that a maximum value of the amount of heat generated by the absorption of the SHG by the THG in the element was located more toward the output end side than the central part of the element and heat generation was concentrated at a position of L/2 to 2L/3 from the incident portion when L indicates the element length.

Based on these experimental results, the present embodiment proposes the structure of suppressing a reduction in conversion efficiency and a reduction in output power and preventing a crystal damage caused by a temperature distribution due to heat generated in the wavelength conversion element.

Specifically, the present invention proposes a structure of alleviating the concentration of heat generated in the wavelength conversion element or a structure of for suppressing a reduction in conversion efficiency utilizing a heat distribution in an optical system with an optimal focus design to maximize the conversion efficiency in a single-pass conversion of a bulk-type wavelength conversion element. What differs from the conventional construction is that a phenomenon in the optimal construction of the bulk-type wavelength conversion element is not handled and that a heat generation phenomenon by the absorption of the SHG light by the THG is not considered. The power of the SHG at which the conversion efficiency of the SHG is deteriorated is revealed by an experiment to have very strong wavelength dependency as shown in FIG. 9.

The present embodiment is achieved based on the foregoing phenomenon and proposes to reduce a temperature distribution of the wavelength conversion element and to maintain the conversion efficiency by devising a heat radiation structure, improving a temperature control method or heating a part where heat is not generated.

Figure 20:
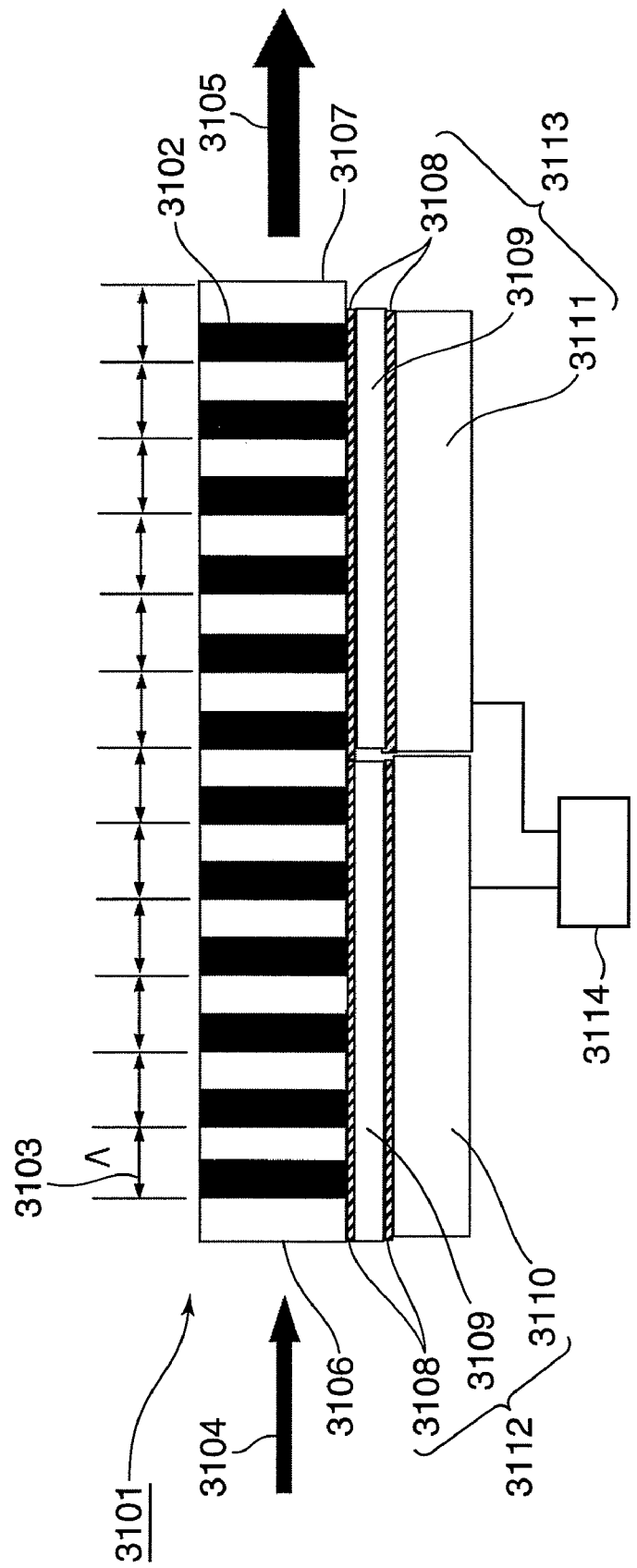
FIG. 20 is a cross-sectional view showing a schematic structure of a short wavelength light source according to a ninth embodiment of the present invention.

FIG. 20 is a diagram showing a schematic structure of a short wavelength light source in accordance with the ninth embodiment of the present invention. In the short wavelength light source according to the present embodiment, a plurality of Peltier devices 3110, 3111 are arranged in a propagation direction of a wavelength conversion element 3101. The short wavelength light source according to the present embodiment is, as shown in FIG. 20, provided with the wavelength conversion element 3101, a first holder 3112, a second holder 3113 and a controller 3114. The first holder 3112 includes a copper plate 3109 sandwiched between two heat radiation materials 3108 and the Peltier device 3110 for temperature controlling a part of the wavelength conversion element 3101 provided on the copper plate 3109 by controlling the temperature of the copper plate 3109, and the second holder 3113 includes a copper plate 3109 sandwiched between two heat radiation materials 3108 and the Peltier device 3111 for temperature controlling a remaining part of the wavelength conversion element 3101 provided on the copper plate 3109 by controlling the temperature of the copper plate 3109. The Peltier device 3110 of the first holder 3112 and the Peltier device 3111 of the second holder 3113 are respectively connected to the controller 3114 to be temperature-controlled by the controller 3114.

In the short wavelength light source of the present embodiment, a plurality of periodically poled regions 3102 are formed in the wavelength conversion element 3101. The thickness of a substrate forming the wavelength conversion element 3101 is 1 mm. The periodically poled regions 3102 are formed along a Y-axis of a substrate crystal. The periodically poled regions 3102 are formed from a +Z surface of the substrate toward a −Z surface. The periodically poled regions 3102 are formed by an electric field applying method. Poling periods 3103 are 6.97 μm(Λ), and light (Nd:YAG laser) having a wavelength of 1064 nm can be wavelength converted into green light having a wavelength of 532 nm. The Peltier devices 3110, 3111 were used as temperature controlling elements for controlling the temperature of the wavelength conversion element 3101. In the present embodiment, the Peltier devices 3110, 3111 are respectively arranged in the light propagation direction and controllable at independent temperatures.

In the case of converting a fundamental wave 3104 having a wavelength of 1064 nm into a SHG 3105 having a wavelength of 532 nm in the wavelength conversion element 3101 of the present embodiment, when a fundamental wave input is 10 W, a focus diameter of the fundamental wave 3104 is φ33 μm and a beam quality of the fundamental wave 3104 has a substantially ideal Gaussian distribution, the value of the amount of heat generated by the absorption by the THG is maximized at a position of 5 mm to 6 mm from an incident surface 3106 of the wavelength conversion element 3101 and the temperature of the element increases with this position as a center to form a temperature distribution when the length of the wavelength conversion element 3101 is 10 mm. Accordingly, a conversion efficiency reduction of the wavelength conversion element can be suppressed by arranging the Peltier devices for temperature control in immediate proximity in a part from the center of the element to the vicinity of an output surface 3107 and performing a temperature control of the wavelength conversion element 3101.

The present embodiment has been explained through the case of adopting the wavelength conversion element of 10 mm. However, the wavelength conversion element of the present embodiment is not intended to be limited to this. Provided that the element length be L and a focused spot position of the fundamental wave be located at L/2, then heat generation is concentrated at the position of L/2 to 2L/3 from the incident surface due to the SHG absorption by the THG. Therefore, by carrying out the temperature control as in the present embodiment to suppress a temperature distribution with the center of the above position, it is therefore possible to suppress a reduction in conversion efficiency and a reduction in output power.

Figure 21:
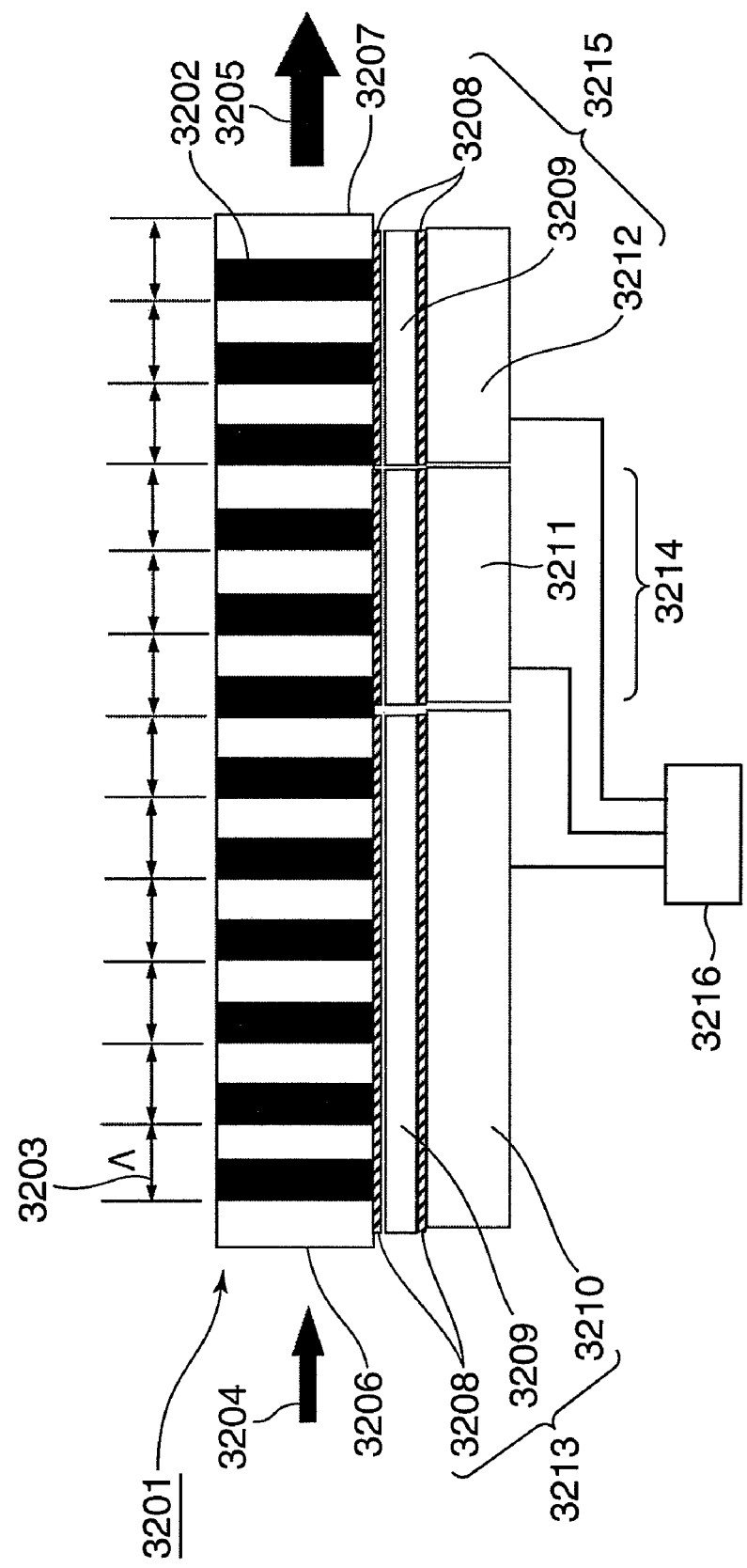
FIG. 21 is a cross-sectional view showing another schematic structure of the short wavelength light source according to the ninth embodiment of the present invention.

In the foregoing embodiment, the temperature control is performed by arranging one Peltier device in vicinity of the output surface where a temperature increase notably appears in order to prevent a temperature distribution generated in the propagation direction. However, the present embodiment is not intended to be limited to this. For example, two or more Peltier devices may be provided at positions where a temperature distribution are liable to occur. For example, as shown in FIG. 21, a plurality of Peltier devices may be provided at a position of 5 mm to 6 mm from the incident side of the wavelength conversion element where heat generation is concentrated and at a position in vicinity of the output surface so as to maintain the element temperature in conformity with the temperature distribution in the propagation direction. Other arrangements of the Peltier device(s) may be equally adopted as long as the temperature distribution can be suppressed.

Tenth Embodiment

Figure 22:
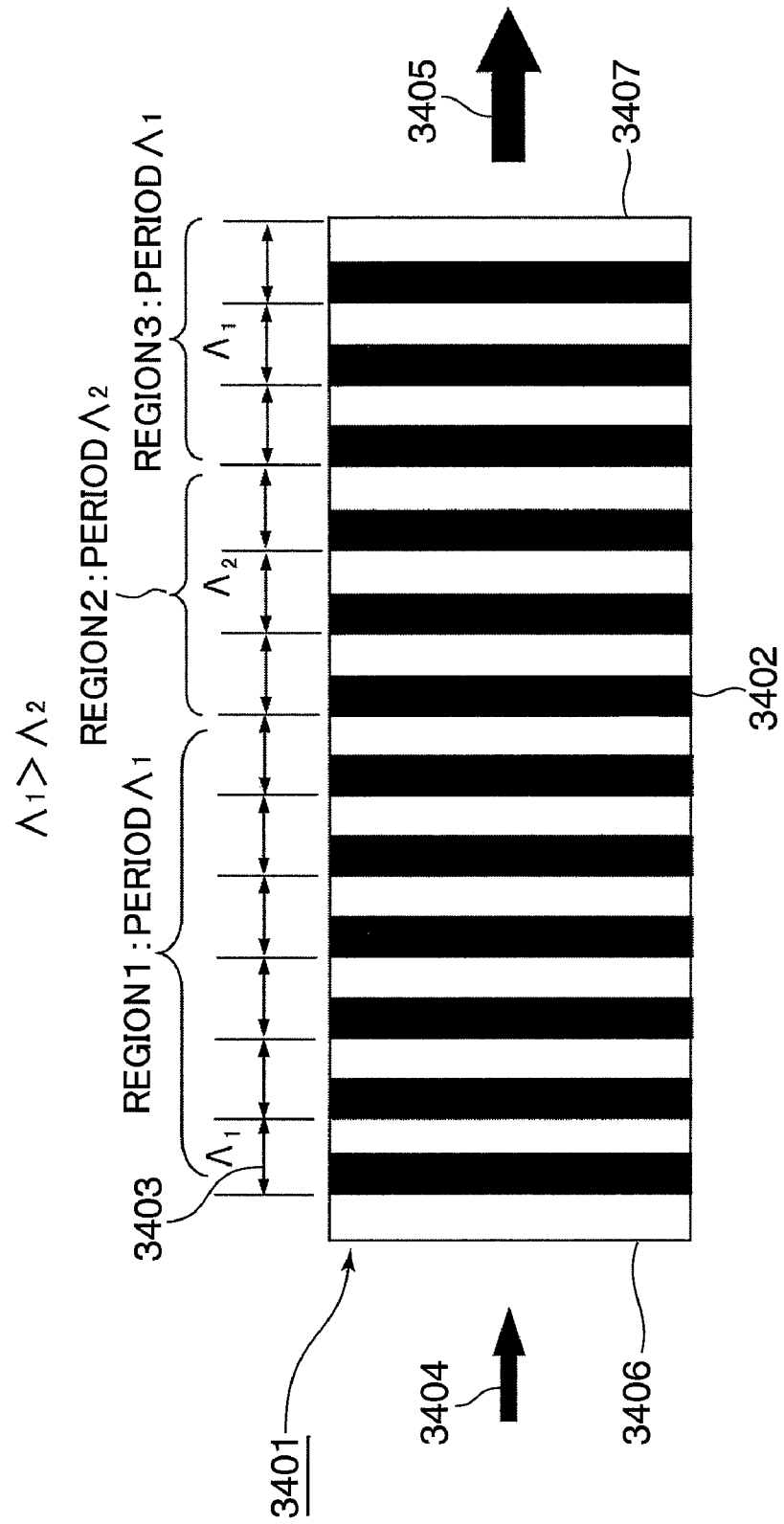
FIG. 22 is a cross-sectional view showing a schematic structure of a short wavelength light source according to a tenth embodiment of the present invention.

Next, the tenth embodiment of the present invention is described. In the present embodiment, a conversion efficiency reduction is suppressed by shortening poling periods in a part where a phase matching condition is displaced due to heat generation to compensate for a displacement in the phase matching condition. FIG. 22 is a cross-sectional view showing a schematic structure of a short wavelength light source in accordance with the tenth embodiment of the present invention.

In the short wavelength light source of the present embodiment, a fundamental wave 3404 is incident on an incident surface 3406 of a wavelength conversion element 3401 and is converted into a SHG 3405 by periodically poled regions 3402, and the SHG 3405 is outputted from an output surface 3407.

Figure 24B:
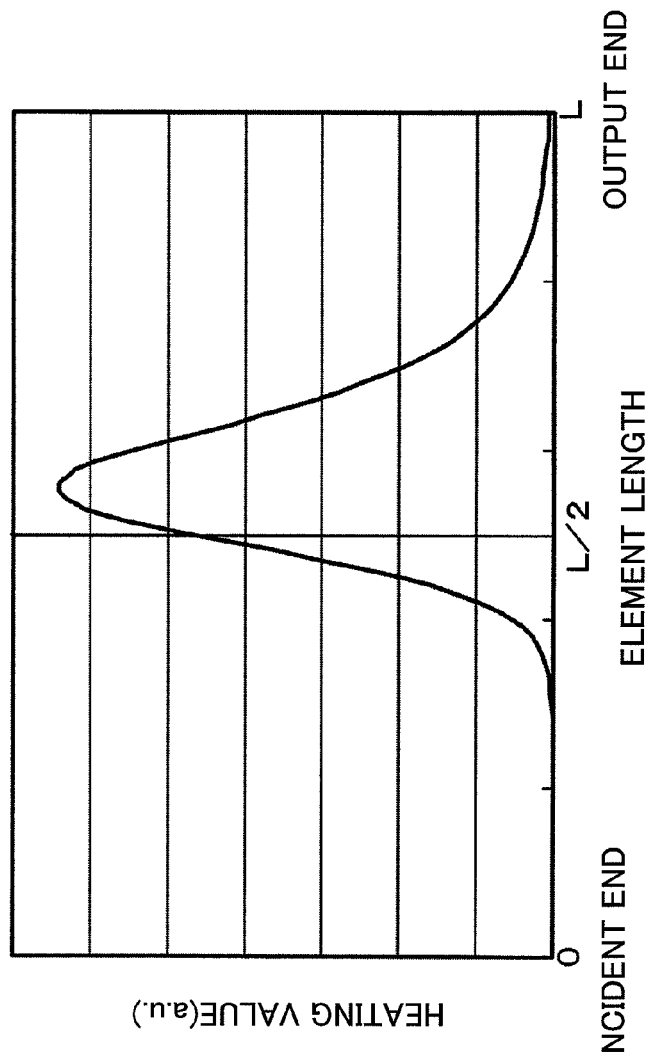

As shown in FIG. 24B, an amount of heat generated by the absorption of a SHG by a THG is maximized at a position of 5 mm to 6 mm from the incident surface 3406 of the element and the temperature of the element increases with this position as a center to from a temperature distribution when the length of the wavelength conversion element 3401 is 10 mm. Thus, poling periods are shorter at a peak position of heat generation, i.e. in a region 2 than in a region 1. In other words, in the present embodiment, a periodically poled structure of the wavelength conversion element has, in a region where a refractive index increases due to a temperature increase caused by the SHG absorption in the wavelength conversion element, periods different from and shorter than those in other region.

Specifically, the poling periods are designed to establish a relationship of Λ1>Λ2 if Λ1 are periods in regions (regions 1, 3) where no heat is generated and the refractive index does not change and Λ2 are periods in a region (region 2) where the refractive index increases due to heat generation. Here is described a case where a fundamental wave 3404 having a wavelength of 1064 nm is converted into a SHG 3405 having a wavelength of 532 in a wavelength conversion element made of MgO-doped $LiNbO_3$ having a periodically poled structure. When an input of the fundamental wave 3404 is 10 W, a focus diameter of the fundamental wave 3404 is φ33 μm and a beam quality of the fundamental wave 3404 has a substantially ideal Gaussian distribution, an amount of heat generated by absorption by a TGH is maximized at a position of 5 mm to 6 mm from the incident surface 3406 of the element and the temperature of the element increases with this position as a center to form a temperature distribution when the length of the wavelength conversion element 3401 is 10 mm. Accordingly, by slightly reducing the poling periods after the position of 5 mm to 6 mm from the incident surface 3406 of the element as an optimal structure of the wavelength conversion element, the conversion efficiency of the wavelength conversion element can be improved significantly. Specifically, the poling periods of the regions 1, 3 were set to 6.97 μm and the poling periods of the region 2 were set to 6.969 μm. By setting the periodically poled structure to have shorter periods in the area where heat is generated by the SHG absorption by the THG to increase the refractive index than in other region, the conversion efficiency can be improved by compensating for the influence of a change in temperature caused by the absorption.

The present embodiment has been explained through the case of adopting the wavelength conversion element of 10 mm. However, the wavelength conversion element of the present embodiment is not intended to be limited to this. Provided that the element length be L and a focused spot position of the fundamental wave be located at L/2, then heat generation is concentrated at the position of L/2 to 2L/3 from the incident surface due to the SHG absorption by the THG. Therefore, a reduction in conversion efficiency and a reduction in output power can be suppressed by reducing the poling periods as in the present embodiment to compensate for a temperature distribution with the center of the above position.

Figure 23:
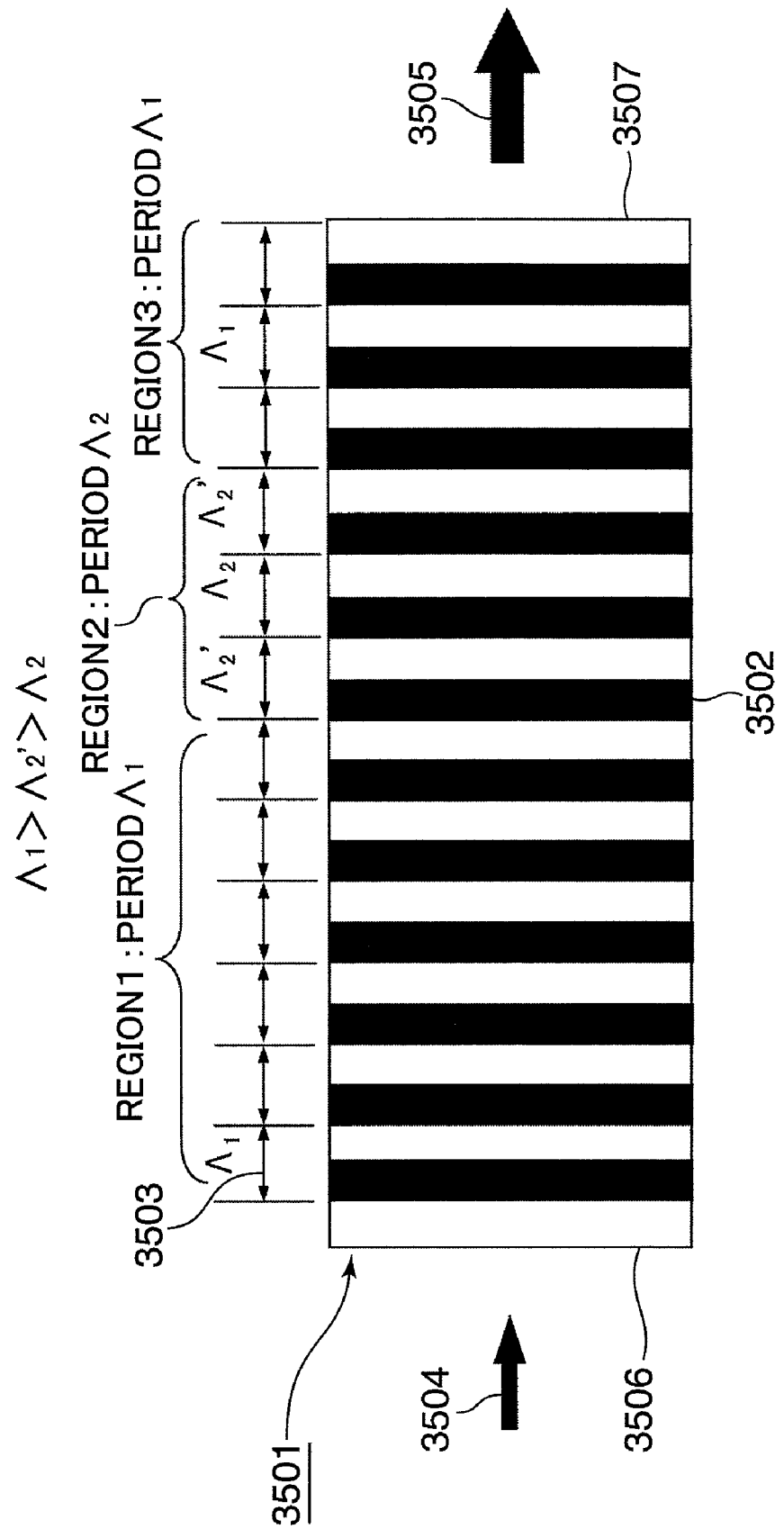
FIG. 23 is a cross-sectional view showing another schematic structure of the short wavelength light source according to the tenth embodiment of the present invention.

Although the periods of the periodically poled structure in the region 2 have a fixed value in the present embodiment, it is preferable to increase the periods with the peak position of the heat generation as a center. As shown in FIG. 24B, when the element length is 10 mm, a heat generation peak is located at a position of 5 mm to 6 mm from the incident surface and a temperature increase at that position is largest. It is therefore preferable that the periods of the poled structure in the region 2 gradually increases with such a position of the heat generation peak as to completely compensate for the temperature distribution in the element as a center, for example, as shown in FIG. 23.

In the short wavelength light sources of the foregoing ninth and tenth embodiments, the MgO-doped LiNbO₃ Z-substrate formed with the periodically poled regions was used as the wavelength conversion element. Other than the MgO-doped LiTaO₃ substrate, a similar substrate having a stoichiometric composition or the like may be used. Other than the Mg-doped substrates, a similar phenomenon can be expected a similar phenomenon can be expected when adopting In, Zn or Sc-doped substrates. It is therefore possible to obtain the same effect as achieved from the foregoing ninth and tenth embodiments.

The short wavelength light sources according to the ninth and tenth embodiments are particularly effective for the wavelength conversion in the case of a fundamental wave having a phase matched wavelength of 1200 nm or shorter. Since the phenomenon described in the foregoing ninth and tenth embodiments results from heat generated by absorbing harmonic wave induced by the ultraviolet light as generated, it notably appears in a wavelength range where ultraviolet light is generated. In other words, these embodiments are effective for converting a fundamental wave having a wavelength of 1200 nm or shorter to generate sum frequency wave of the fundamental wave and the harmonic wave, having a wavelength of 400 nm or shorter.

The harmonic absorption induced by the generation of ultraviolet light is confirmed to be notable when a fundamental wave power is 10 W or higher or a harmonic power is 3 W or higher. Thus, the short wavelength light sources of the above ninth and tenth embodiments are effective in the case of a fundamental wave or a harmonic wave of such high power.

High-luminance laser image forming apparatuses can be realized using the short wavelength light sources according to the foregoing ninth and tenth embodiments. High-luminance laser image forming apparatuses include, for example, rear projection image forming apparatuses for modulating high-output laser light by a spatial light modulation element and projecting the resulting laser light onto a screen and liquid crystal televisions using high-output laser light sources as backlights. According to the short wavelength light sources of the ninth and tenth embodiments, a stable output characteristic can be realized at the time of a high output power, thereby realizing clear video images of high luminance free from degradation.

In the foregoing ninth and tenth embodiments, explanations have been given through the case where the refractive index increases by heat generation and the phase matching condition is displaced to reduce the conversion efficiency (output). However, a reduction in the conversion efficiency (output) can be suppressed by compensating for the displacement in the phase matching condition by adopting the periodically polarized-inversion period and carrying out a temperature control also in the case where a reduction in conversion efficiency (output) occurs otherwise due to a displacement in phase matching condition resulting from changes in refractive index in the crystal changes upon the incidence of laser light. Namely, a reduction in conversion efficiency can be suppressed by adopting the periodically polarized-inversion period and carrying out the temperature control to compensate for a displacement in phase matching condition, and it is therefore possible to achieve the same effect as achieved from the foregoing ninth and tenth embodiments.

The present invention is summarized as follows from the above respective embodiments. Specifically, a short wavelength light source according to one aspect of the present invention includes: a wavelength conversion element having an incident surface, on which a fundamental wave is incident, and an output surface, from which a harmonic wave is outputted, the wavelength conversion element being provided for converting the fundamental wave into the harmonic wave; and a holder for holding said wavelength conversion element, wherein the wavelength conversion element has a specific region on the light output side, which is arranged so as to suppress variations in phase matching condition between the fundamental wave and the harmonic wave resulting from heat generated by absorbing the harmonic wave during a wavelength conversion.

According to the foregoing structure of the short wavelength light source, variations in phase matching condition between the fundamental wave and the harmonic wave resulting from heat generation is suppressed even if heat is generated by the absorption of the harmonic wave in the specific region of the wavelength conversion element. It is therefore possible to stabilize a harmonic output.

It is preferable that the thermal resistance between the specific region and the holder be lower than the thermal resistance between the holder and the region other than the specific region.

According to the foregoing structure, the heat generated from the specific region can be radiated in an efficient manner. It is therefore possible to more effectively suppress variations in phase matching condition.

It is preferable that the holder includes a first temperature changing member for changing the temperature of the specific region; and the first temperature changing member changes the temperature of the specific region such that the temperature of the specific region becomes substantially equal to the region other than the specific region.

According to the foregoing structure, a temperature distribution of the wavelength conversion element can be maintained uniform. It is therefore possible to suppress variations in phase matching condition in the specific region.

It is preferable that the light intensity of the harmonic wave increases in a direction from the incident surface to the output surface of the wavelength conversion element; and the specific region is defined to be a region from a position where an intensity of the harmonic wave exceeds a predetermined value to the output surface. It is also preferable that the predetermined value is 1.5 W when the wavelength of the harmonic wave falls in a range of from 500 nm to 550 nm, 0.2 W when the wavelength of the harmonic wave falls in a range of from 400 nm to 450 nm and 0.05 W when the wavelength of the harmonic wave falls in a range of from 340 nm to 400 nm.

According to the foregoing structure, the position of the specific region can be accurately grasped. It is therefore possible to more effectively suppress variations in phase matching condition in the specific region.

It is preferable that the specific region has a length equal to or shorter than a half the length of said wavelength conversion element.

According to the foregoing structure, the output of the harmonic wave can be increased up to a maximum value without leading to the destruction of the wavelength conversion element.

It is preferable that the holder further includes a second temperature changing member for changing the temperature of the region other than the specific region; and a terminal resistance θ1 between the specific region and the first temperature changing member and a thermal resistance θ2 between the region other than the specific region and the second temperature changing member satisfy the following relationship: θ1<θ2.

According to the foregoing structure, heat generated from the specific region can be efficiently radiated. It is therefore possible to more effectively suppress variations in phase matching condition in the specific region.

It is preferable that a distance between a beam path of the fundamental wave in the wavelength conversion element and a surface of the specific region on the side of the holder is shorter than a distance between the beam path of the fundamental wave and a surface of the region other than the specific region on the side of the holder.

According to the foregoing structure, the heat generated from the specific region can be efficiently radiated from the holder side. It is therefore possible to suppress variations in phase matching condition more effectively.

It is preferable that the specific region has a thickness smaller than that of the region other than the specific region.

According to the foregoing structure, a temperature increase in the specific region can be alleviated. It is therefore possible to suppress variations in phase matching condition more effectively.

It is preferable that the first temperature changing member is a first heat radiating member for radiating heat from the specific region, generated resulting from absorbing the harmonic wave from a surface thereof; the second temperature changing member is a second heat radiating member for radiating heat from the region other than the specific region from a surface thereof; and the surface area of the first heat radiating member is larger is size than the surface area of the second heat radiating member.

According to the foregoing structure, heat generated from the specific region can be radiated efficiently. It is therefore possible to suppress variations in phase matching condition more effectively.

It is preferable that a heating unit for heating the region other than the specific region is further provided, and that the heating unit heats the region other than the specific region such that the temperature of the region other than the specific region is substantially equal to that of the specific region.

According to the foregoing structure, a temperature distribution of the wavelength conversion element can be maintained uniform. It is therefore possible to suppress variations in phase matching condition in the specific region more effectively.

It is preferable that the period for the periodically poled structure in the specific region is set to be shorter than the period for the periodically poled structure in the region other than the specific region.

According to the foregoing structure, the period for the periodically poled structure in the specific region is set to be shorter than the period for the periodically poled structure in the region other than the specific region. It is therefore possible to suppress variations in phase matching condition even when heat is generated by the absorption of the harmonic wave in the specific region of the wavelength conversion element.

It is preferable that the period for the periodically poled structure in the specific region set to be gradually shorter in a direction from the incident surface to the output surface of the wavelength conversion element.

According to the foregoing structure, the period for the periodically poled structure becomes shorter as the light intensity of the harmonic wave increases. It is therefore possible to suppress variations in phase matching condition more effectively.

It is preferable that the period for the periodically poled structure in the specific region is set according to a temperature distribution of the specific region.

According to the foregoing structure, since the period for the periodically poled structure becomes shorter according to the temperature distribution of the specific region, the period for the periodically poled structure matching the respective temperatures can be set. It is therefore possible to suppress variations in phase matching condition more effectively.

It is preferable that an optical system be further provided for causing a fundamental wave emitted from a fundamental wave light source to be incident on the wavelength conversion element and focusing the fundamental wave in the wavelength conversion element, wherein the specific region is formed in vicinity of a focused spot of the fundamental wave by the optical system on the output surface side of the focused spot.

According to the foregoing structure, the specific region can be accurately grasped according to the position of the focused spot of the fundamental wave. It is therefore possible to suppress variations in phase matching condition in the specific region more effectively.

It is preferable that the period for the periodically poled structure in the specific region be set to be gradually shorter both in a direction from the center of the specific region to the incident surface and in a direction from the center of the specific region to the output surface of the wavelength conversion element.

According to the foregoing structure, the period for the periodically poled structure is set to be shorter as the light intensity of the harmonic wave increases. It is therefore possible to suppress variations in phase matching condition in the specific region more effectively.

It is preferable that a beam intensity distribution of the fundamental wave is approximated to a Gaussian distribution; and the specific region is formed at position of L/2 to 2L/3 from the incident surface to the output surface when the following relationship holds:

$$L \times \lambda / (2\pi \times n \times \omega_0^2) = 2.84$$

wherein L indicates a length L of the wavelength conversion element, $\omega_0$ indicates a radius of the focused spot, $\lambda$ indicates a wavelength of the fundamental wave, n indicates a refractive index of the wavelength conversion element for the fundamental wave.

According to the foregoing structure, the harmonic wave output can be stabilized while improving the conversion efficiency from the fundamental wave into the harmonic wave to the maximum.

It is preferable that the wavelength conversion element be made of $LiTa_{(1-x)}Nb_xO_3$ ($0 \leq x \leq 1$) doped with at least one of Mg, In, Zn and Sc.

According to the foregoing structure, even in this case of making the wavelength conversion element of $LiTa_{(1-x)}Nb_xO_3$ ($0 \leq x \leq 1$) doped with at least one of Mg, In, Zn and Sc, it is possible to stabilize the harmonic wave output by suppressing variations in phase matching condition due to heat generated by absorbing the harmonic wave.

A laser image forming apparatus according to another aspect of the present invention includes the short wavelength light source of any of the foregoing structures; and a spatial light modulation element for modulating light emitted from the short wavelength light source.

According to the foregoing structure of the laser image forming apparatus, an output of the light emitted from the short wavelength light source is stabilized and the spatial light modulation element forms an image by spatially modulating the light. It is therefore possible to form images with an improved precision.

INDUSTRIAL APPLICABILITY

According to the short wavelength light source and a laser image forming apparatus of the present invention, the conversion efficiency from a fundamental wave into a harmonic wave at the time of a high power output can be maintained, and the resulting wavelength-converted higher power harmonic light can be outputted under stable conditions. The short wavelength light source and the laser image forming apparatus of the present invention are therefore suitably applied to a short wavelength light source for emitting light having a short wavelength and a laser image forming apparatus adopting the same.

What is claimed is:
1. A short wavelength light source comprising:
a wavelength conversion element for converting a fundamental wave into a harmonic wave, said wavelength conversion element including:
an incident surface, to which the fundamental wave is incident;
an output surface, from which the harmonic wave is outputted, said output surface being located at a light output side of said wavelength conversion element; and
a specific region located at said light output side, said specific region being arranged to suppress variations in phase matching conditions, between the fundamental wave and the harmonic wave, which result from heat generated by absorbing the harmonic wave during a wavelength conversion of converting the fundamental wave into the harmonic wave; and
a holder for holding said wavelength conversion element, said holder including:
a first heat radiation member holding said wavelength conversion element at a region other than said specific region; and
a second heat radiation member holding said wavelength conversion element at said specific region, said second heat radiation member having a higher thermal conductivity than said first heat radiation member,
wherein a thickness of said specific region is smaller than a thickness of said other region.

2. The short wavelength light source according to claim 1, wherein:
said holder includes a first temperature changing member for changing a temperature of said specific region; and
said first temperature changing member changes the temperature of said specific region, such that the temperature of said specific region becomes substantially equal to a temperature of said other.

3. The short wavelength light source according to claim 2, wherein:
said holder further includes a second temperature changing member for changing the temperature of said other region; and
a terminal resistance $\theta 1$ between said specific region and said first temperature changing member and a thermal resistance $\theta 2$ between said other region and said second temperature changing member satisfy the following relationship:
$\theta 1 < \theta 2$.

4. The short wavelength light source according to claim 3, wherein:
said first temperature changing member is a first heat radiating member for radiating heat from said specific region, the heat radiated from said specific region being generated as a result from absorbing the harmonic wave from a surface of said first heat radiating member;
said second temperature changing member is a second heat radiating member for radiating heat from said other region, the heat radiated from said other region being radiated from a surface of said second heat radiating member; and
a size of a surface area of said first heat radiating member is larger than a size of a surface area of said second heat radiating member.

5. The short wavelength light source according to claim 1, wherein:
a light intensity of the harmonic wave increases in a direction from said incident surface to said output surface of said wavelength conversion element; and
said specific region of said wavelength conversion element is a region starting from a position where an intensity of the harmonic wave exceeds a predetermined value and extending to said output surface.

6. The short wavelength light source according to claim 5, wherein the harmonic wave has a wavelength ranging from 500 nm to 550 nm, and the predetermined value is 1.5 W.

7. The short wavelength light source according to claim 5, wherein the harmonic wave has a wavelength ranging from 400 nm to 450 nm, and the predetermined value is 0.2 W.

8. The short wavelength light source according to claim 5, wherein the harmonic wave has a wavelength ranging from 340 nm to 400 nm, and the predetermined value is 0.05 W.

9. The short wavelength light source according to claim 1, wherein said specific region has a length equal to or shorter than half a length of said wavelength conversion element.

10. The short wavelength light source according to claim 1, wherein a distance between a beam path of the fundamental wave in said wavelength conversion element and a surface of said specific region on a side of said holder is shorter than a distance between the beam path of the fundamental wave and a surface of said other region on the side of said holder.

11. The short wavelength light source according to claim 10, wherein a beam of the fundamental wave passes in a vicinity of the surface of said specific region on the side of said holder.

12. The short wavelength light source according to claim 10, wherein a beam of the fundamental wave is reflected by the surface of said specific region or a surface of a region in a vicinity of said specific region on the side of said holder.

13. The short wavelength light source according to claim 1, further comprising a heating unit for heating said other region,
wherein said heating unit heats said other region, such that the temperature of said other region is substantially equal to the temperature of said specific region.

14. The short wavelength light source according to claim 1, wherein a period for a periodically poled structure in said specific region becomes gradually shorter in a direction from said incident surface to said output surface of said wavelength conversion element.

15. The short wavelength light source according to claim 14, wherein the period for the periodically poled structure in said specific region is set according to a temperature distribution of the said specific region.

16. The short wavelength light source according to claim 1, further comprising an optical system for causing the fundamental wave to be emitted from a fundamental wave light source and to be incident to said wavelength conversion element and for focusing the fundamental wave in said wavelength conversion element,
wherein said specific region is formed in a vicinity of a focused spot of the fundamental wave by the optical system on an output surface side of the focused spot.

17. The short wavelength light source according to claim 16, wherein a period for a periodically poled structure in said specific region gradually increases both in a direction from a center of said specific region to said incident surface and in a direction from the center of said specific region to said output surface of said wavelength conversion element.

18. The short wavelength light source according to claim 16, wherein:
a beam intensity distribution of the fundamental wave is approximated to a Gaussian distribution; and
said specific region is formed at position of L/2 to 2L/3 from said incident surface to said output surface when the following relationship holds:
$L \times \lambda/(2\pi \times n \times \omega_0^2)=2.84$, where L indicates a length L of said wavelength conversion element, $\omega_0$ indicates a radius of the focused spot, $\lambda$ indicates a wavelength of the fundamental wave, n indicates a refractive index of said wavelength conversion element for the fundamental wave.

19. The short wavelength light source according to claim 1, wherein said wavelength conversion element is made of $LiTa_{(1-x)}Nb_xO_3$ ($0 \leqq x \leqq 1$) doped with at least one of Mg, In, Zn and Sc.

20. A laser image forming apparatus, comprising:
said short wavelength light source according to claim 1; and
a spatial light modulation element for modulating light emitted from said short wavelength light source.

21. A short wavelength light source comprising:
a wavelength conversion element for converting a fundamental wave into a harmonic wave, said wavelength conversion element including:
an incident surface, to which the fundamental wave is incident;
an output surface, from which the harmonic wave is outputted, said output surface being located at a light output side of said wavelength conversion element; and
a specific region located at said light output side, said specific region being arranged to suppress variations in phase matching conditions, between the fundamental wave and the harmonic wave, which result from heat generated by absorbing the harmonic wave during a wavelength conversion of converting the fundamental wave into the harmonic wave; and
a holder for holding said wavelength conversion element, said holder including:
a first heat radiation member holding said wavelength conversion element at a region other than said specific region; and
a second heat radiation member holding said wavelength conversion element at said specific region, said second heat radiation member having a higher thermal conductivity than said first heat radiation member,
wherein a period for a periodically poled structure in said specific region is shorter than a period for a periodically poled structure in said other region.

* * * * *